(12) United States Patent
Ferreira et al.

(10) Patent No.: US 12,729,905 B2
(45) Date of Patent: Sep. 8, 2026

(54) VACUUM PORT PRESSURE SENSOR COVER

(71) Applicant: WHIRLPOOL CORPORATION, Benton Harbor, MI (US)

(72) Inventors: Luiz A. Ferreira, Joinville (BR); Adalberto B. Junior, Joinville (BR); Jackeline Laurindo, Joinville (BR); Marcel Lessa, Joinville (BR)

(73) Assignee: Whirlpool Corporation, Benton Harbor, MI (US)

( * ) Notice: Subject to any disclaimer, the term of this patent is extended or adjusted under 35 U.S.C. 154(b) by 155 days.

(21) Appl. No.: 18/543,632

(22) Filed: Dec. 18, 2023

(65) Prior Publication Data

US 2025/0198693 A1 Jun. 19, 2025

(51) Int. Cl.
*F25D 29/00* (2006.01)
*G01L 19/00* (2006.01)

(52) U.S. Cl.
CPC ........ *F25D 29/005* (2013.01); *G01L 19/0007* (2013.01); *F25D 2201/14* (2013.01)

(58) Field of Classification Search
None
See application file for complete search history.

(56) References Cited

U.S. PATENT DOCUMENTS 2,000,882 A * 5/1935 Comstock ............. F25D 23/062 220/592.27
4,745,015 A * 5/1988 Cheng ..................... E04B 1/803 428/920
5,027,574 A * 7/1991 Phillip ................ E06B 3/66309 52/786.13
5,318,108 A * 6/1994 Benson ..................... F01N 5/02 165/96
5,345,814 A * 9/1994 Cur ....................... G01M 3/202 73/49.3
5,500,305 A * 3/1996 Bridges ................... E04B 1/803 29/DIG. 44
5,934,085 A * 8/1999 Suzuki .................. F25D 23/064 220/592.27

(Continued)

FOREIGN PATENT DOCUMENTS

EP 4198422 A1 * 6/2023 ........... G01L 19/148
WO WO-2022001696 A1 * 1/2022 ............. F25D 23/02

*Primary Examiner* — Hanh V Tran
(74) *Attorney, Agent, or Firm* — Price Heneveld LLP

(57) ABSTRACT

An appliance includes an appliance cabinet defining a compartment, and an appliance door operably coupled to the appliance cabinet. The appliance door includes a trim breaker, a door wrapper, and a door liner including studs coupled thereto. The door wrapper and the door liner are coupled to the trim breaker and define an insulation cavity therebetween. An at least partial vacuum is defined in the insulation cavity. A sensor assembly and a vacuum port assembly are coupled to the door liner. A port cover coupled to the appliance door. The port cover includes a base defining openings. The base includes locking features on opposing sides of the base and stud connectors, where the locking features are configured to couple to opposing sides of the trim breaker, respectively. The stud connectors are configured to couple to the studs. A cover assembly is coupled to the base.

15 Claims, 13 Drawing Sheets

(56) References Cited

U.S. PATENT DOCUMENTS

| | | | | |
|---|---|---|---|---|
| 6,109,712 | A * | 8/2000 | Haworth | A47L 15/4209 312/406 |
| 8,020,949 | B2 | 9/2011 | Davis et al. | |
| 9,791,205 | B2 * | 10/2017 | Mukherjee | F25D 23/063 |
| 10,143,099 | B2 * | 11/2018 | Cordes | H05K 5/0069 |
| 10,605,520 | B1 * | 3/2020 | Ekshinge | F25D 23/067 |
| 10,995,488 | B1 * | 5/2021 | Allard | F25D 23/062 |
| 11,035,607 | B2 * | 6/2021 | Naik | F25D 23/06 |
| 11,480,385 | B2 * | 10/2022 | Dherde | F25D 23/06 |
| 12,038,340 | B2 * | 7/2024 | Allard | F25D 23/028 |
| 12,385,797 | B2 * | 8/2025 | Allard | G01L 19/148 |
| 2011/0146327 | A1 | 6/2011 | Song | |
| 2014/0015395 | A1 | 1/2014 | Anthony et al. | |
| 2020/0132243 | A1 * | 4/2020 | Vaze | F16L 59/06 |
| 2020/0373231 | A1 * | 11/2020 | Chew | H01L 25/072 |
| 2021/0045530 | A1 * | 2/2021 | Davison | F24C 15/02 |
| 2021/0265248 | A1 * | 8/2021 | Yao | H01R 43/0207 |
| 2022/0128294 | A1 | 4/2022 | Frattini et al. | |
| 2022/0196200 | A1 | 6/2022 | Allard et al. | |
| 2022/0349176 | A1 | 11/2022 | Allard et al. | |
| 2022/0381390 | A1 | 12/2022 | Ekshinge et al. | |
| 2022/0400858 | A1 | 12/2022 | Harikrishnasamy et al. | |
| 2023/0194372 | A1 | 6/2023 | Allard et al. | |
| 2024/0203802 | A1 * | 6/2024 | Yang | H01L 23/3736 |
| 2025/0137712 | A1 * | 5/2025 | Lessa | F25D 23/028 |

* cited by examiner 336
338
344
346
342
330
340
334
344
346
352

VACUUM PORT PRESSURE SENSOR COVER

BACKGROUND OF THE DISCLOSURE

The present disclosure generally relates to a port and pressure sensor cover, and more specifically, to a vacuum port and pressure sensor cover for a vacuum insulated structure.

SUMMARY OF THE DISCLOSURE

According to an aspect of the present disclosure, an appliance includes an appliance cabinet defining a compartment, and an appliance door operably coupled to the appliance cabinet for selective access to the compartment. The appliance door includes a trim breaker, a door wrapper, and a door liner including studs coupled thereto. The door wrapper and the door liner are coupled to the trim breaker and define an insulation cavity therebetween. An at least partial vacuum is defined in the insulation cavity. A sensor assembly is coupled to the door liner and configured to sense a pressure in the insulation cavity. A vacuum port assembly is coupled to the door liner and in fluid communication with the insulation cavity. A port cover coupled to the appliance door. The port cover includes a base defining openings. The vacuum port assembly and the sensor assembly are positioned in the openings, respectively. The base includes locking features on opposing sides of the base and stud connectors, where the locking features are configured to couple to opposing sides of the trim breaker, respectively. The stud connectors are configured to couple to the studs. A cover assembly is coupled to the base.

According to another aspect of the present disclosure, a vacuum insulated door for an appliance includes a liner with studs extending therefrom, a wrapper, and a trim breaker coupled to the wrapper and the liner defining an insulation cavity therebetween. An at least partial vacuum is defined in the insulation cavity. A sensor assembly is coupled to a sensor port defined by the liner, the sensor port in fluid communication with the insulation cavity. A vacuum port assembly is coupled to the liner and in fluid communication with the insulation cavity. A port cover includes a base defining at least one opening in which the vacuum port assembly and the sensor assembly are positioned. The base includes stud connectors configured to engage to the studs to couple the base to the vacuum insulated door. A cover assembly is coupled to the base.

According to yet another aspect of the present disclosure, a port cover for a vacuum insulated door includes a base including a base plate defining an opening configured to receive a vacuum port assembly and a sensor assembly of the vacuum insulated door. The base defines stud apertures configured to receive studs extending from the vacuum insulated door to couple the base to the vacuum insulated door. The base further includes walls extending from the base plate, wherein the walls define engagement apertures. A cover assembly includes a cover bracket including engagement features configured to selectively engage the engagement apertures to selectively couple the cover assembly to the base. An outside wall of the cover bracket extends over the opening when coupled to the base. The cover assembly further includes a cover plate coupled to the cover bracket.

These and other features, advantages, and objects of the present disclosure will be further understood and appreciated by those skilled in the art by reference to the following specification, claims, and appended drawings.

Figure 1:
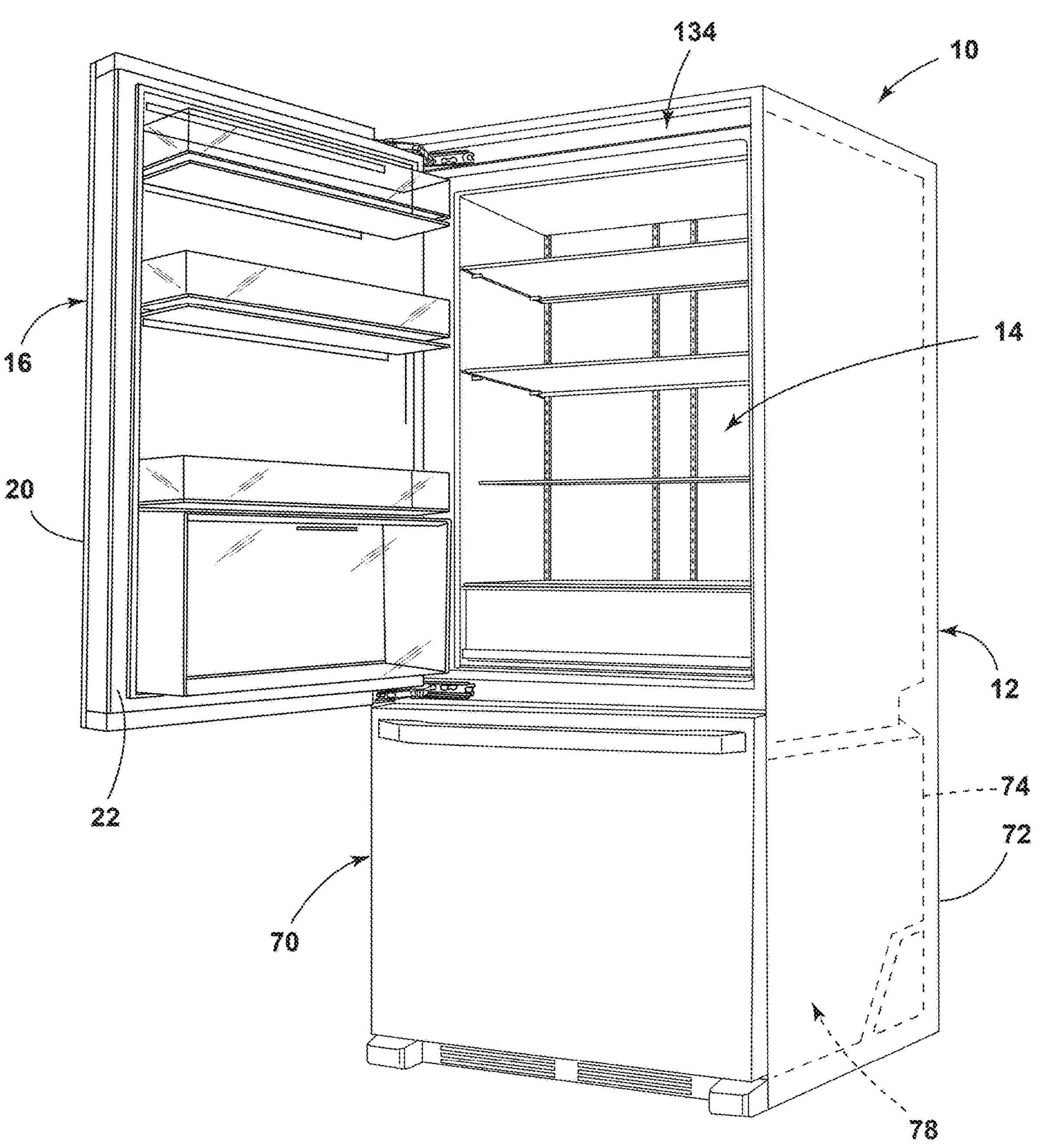
FIG. 1 is a front perspective view of a refrigeration appliance, according to the present disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to a pressure sensor cover. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-14, reference numeral 10 generally designates an appliance 10 that includes an appliance cabinet 12 defining a compartment 14. An appliance door or vacuum insulated door 16 is operably coupled to the appliance cabinet 12 for selective access to the compartment 14. The appliance door 16 includes a trim breaker 18, a door wrapper or outer wrapper 20, and a door liner or inner liner 22. The door wrapper 20 and the door liner 22 are coupled to the trim breaker 18 and define an insulation cavity 24 therebetween. An at least partial vacuum 26 is defined in the insulation cavity 24. A sensor assembly 28 is coupled to the door liner 22 and configured to sense a pressure in the insulation cavity 24. A vacuum port assembly 32 is coupled to the door liner 22 and is in fluid communication with the insulation cavity 24. A port cover or a sensor port and vacuum port cover 34 is coupled to the appliance door 16. The port cover 34 includes a base 36 defining openings 38, which may include a sensor assembly opening 38*a* and a vacuum port assembly opening 38*b*, to receive the vacuum port assembly 32 and the sensor assembly 28. The base 36 includes locking features 40, which may include a first locking feature 40*a* and a second locking feature 40*b*, on opposing sides 42*a*, 42*b* of the base 36 and stud connectors or stud locators 44. The locking features 40 are configured to couple to opposing sides 46*a*, 46*b* of the trim breaker 18, respectively. The stud locators 44 are configured to couple to studs 48 coupled to the door liner 22. A cover assembly 50 is coupled to the base 36.

Figure 2:
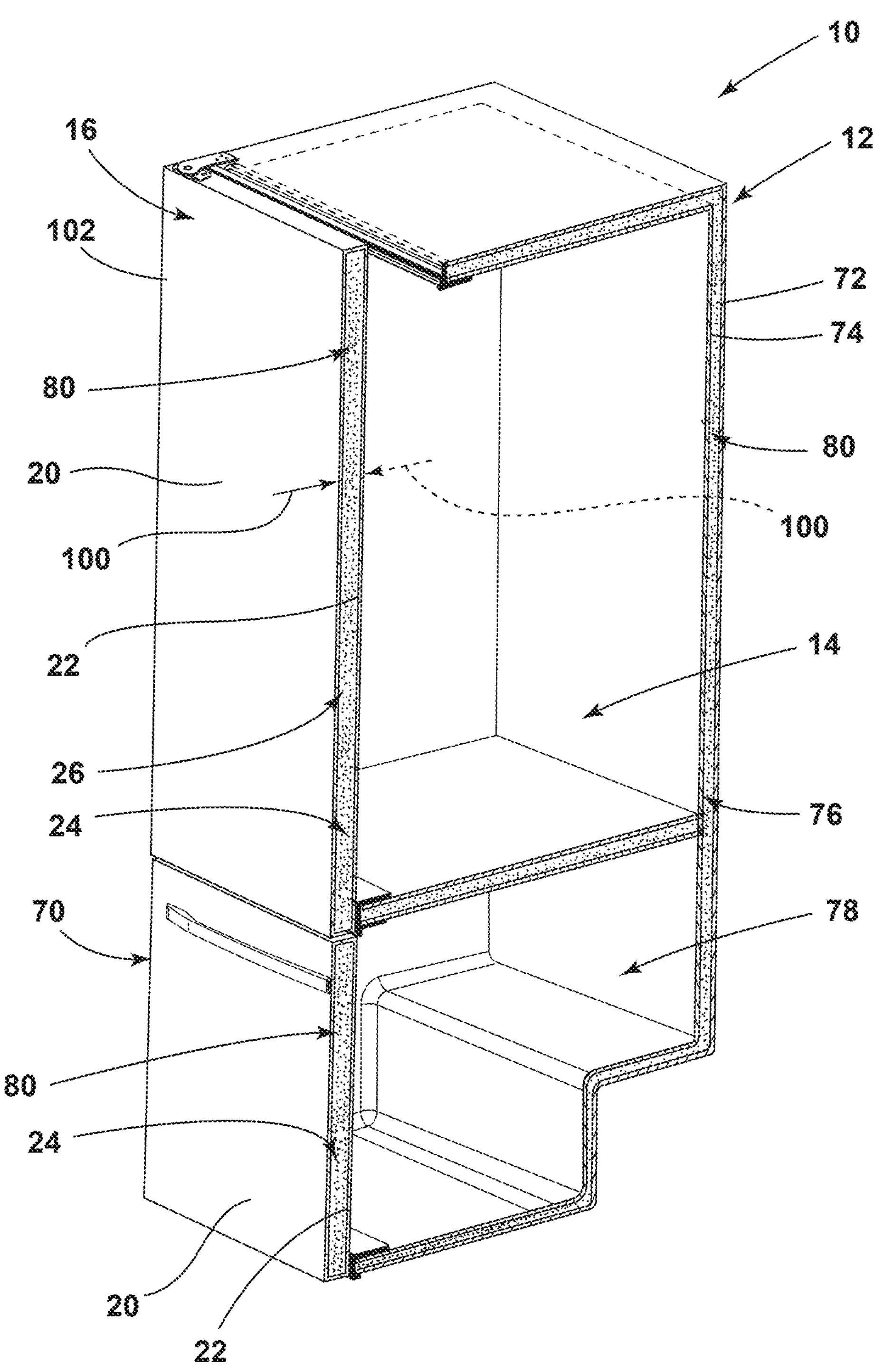
FIG. 2 is a cross-sectional front perspective view of a refrigeration appliance with a vacuum insulated cabinet and vacuum insulated doors, according to the present disclosure.

Referring to FIGS. 1 and 2, the appliance 10 is illustrated as a refrigerating appliance, however, it is contemplated that the appliance door 16 disclosed herein may be used with a variety of appliances, structures, or insulation purposes other than with an appliance 10. Moreover, the illustrated refrigerating appliance 10 is a bottom mount refrigerator having the appliance door 16 and a second appliance door 70, which can have a substantially similar configuration as the appliance door 16 as discussed further herein. The appliance doors 16, 70 may be rotationally and/or laterally operable panels for doors and drawers. In non-limiting examples, the refrigerating appliance 10 can be a bottom mount refrigerator, a bottom mount French door refrigerator, a top mount refrigerator, a side-by-side refrigerator, a four-door French door refrigerator, and/or a five door French door refrigerator, each of which can have one or more appliance doors 16 (e.g., panels).

As illustrated in FIGS. 1 and 2, the appliance 10 includes the two appliance doors 16, 70 that are operably coupled to the cabinet 12. The cabinet 12 defines the first compartment 14 and a second compartment 78, which can be sealed by the appliance door 16 and the second appliance door 70, respectively. The first compartment 14 may be a refrigerator compartment and the second compartment 78 may be a freezer compartment. While the appliance door 16 is rotatably coupled to cabinet 12 and the second appliance door 70 is laterally coupled or slidably coupled to the cabinet 12, the appliance doors 16, 70 can be any rotationally and/or laterally operable insulated panel. Additionally, while appliance door 70 is illustrated as a drawer, it is considered a door for purposes of this application.

The appliance door 16 is an insulated structure or panel having the insulation cavity 24 defined between the door wrapper 20 coupled with the door liner 22. The door wrapper 20 and the door liner 22 may alternatively be referred to as a structural wrapper that defines the insulation cavity 24. Similarly, the cabinet 12 of the appliance 10 is typically an insulated structure having a cabinet wrapper 72 and a cabinet liner 74 with an insulation cavity 76 defined therebetween. The cabinet wrapper 72 and the cabinet liner 74 may alternatively be referred to as a structural wrapper that defines the insulation cavity 76. Each of the insulation cavities 24, 76 of the appliance door 16 and the cabinet 12 typically includes one or more insulation materials 80 disposed therein. It is generally contemplated that the insulation materials 80 may be glass-type materials, carbon-based powders, silicon oxide-based materials, silica-based materials, insulating gasses, and other standard insulation materials 80 known in the art.

The insulation materials 80 substantially fill the insulation cavity 24 of the appliance door 16, forming a substantially continuous layer between the door wrapper 20 and the door liner 22. Similarly, the insulation materials 80 substantially fill the insulation cavity 76 of the cabinet 12 forming a substantially continuous layer between the cabinet wrapper 72 and the cabinet liner 74. The insulation cavities 24, 76 are filled with the insulation materials 80 using a load port defined by the cabinet 12 and the appliance door 16, respectively. The cabinet 12 and the appliance door 16 each may define a vacuum port or an evacuation port 90 for applying a vacuum or negative pressure 26 to the insulation cavities 24, 76, as discussed further herein.

Referring still to FIGS. 1 and 2, the at least partial vacuum 26 is defined within the insulation cavity 24, forming the appliance door 16 as a vacuum insulated structure or a vacuum insulated panel. The at least partial vacuum 26 defines a pressure differential 100 between an exterior 102 of the appliance door 16 and the insulation cavity 24. The pressure differential 100 serves to define an inward compressive force that is exerted on both the door wrapper 20 and the door liner 22 and tends to bias the door wrapper 20 and the door liner 22 toward the insulation cavity 24.

In various implementations, the at least partial vacuum 26 may be defined within the insulation cavity 24, forming the cabinet 12 as a vacuum insulated structure. The pressure differential 100 and the inward compressive force are also exerted in such implementations on both the cabinet wrapper 72 and the cabinet liner 74 and tend to bias the cabinet wrapper 72 and the cabinet liner 74 towards the insulation cavities 76, respectively, in a similar manner as the appliance door 16. However, the cabinet 12 is not limited to such configurations and may be other insulated structures with the insulation materials 80 known in the art. For example, the cabinet 12 may be an insulated structure with foam or other non-vacuum insulation while the door 16 is a vacuum insulated structure and vice versa.

The door wrapper 20, the cabinet wrapper 72, the door liner 22, and the cabinet liner 74 are made from a material at least partially resistant to bending, deformation, or otherwise being deformed in response to an inward compressive force. These materials for the door wrapper 20, the cabinet wrapper 72, the door liner 22, and the cabinet liner 74 include, but are not limited to, metals, polymers, metal alloys, combinations thereof, and/or other similar substantially rigid materials that can be used for vacuum insulated appliances and structures.

Figure 3:
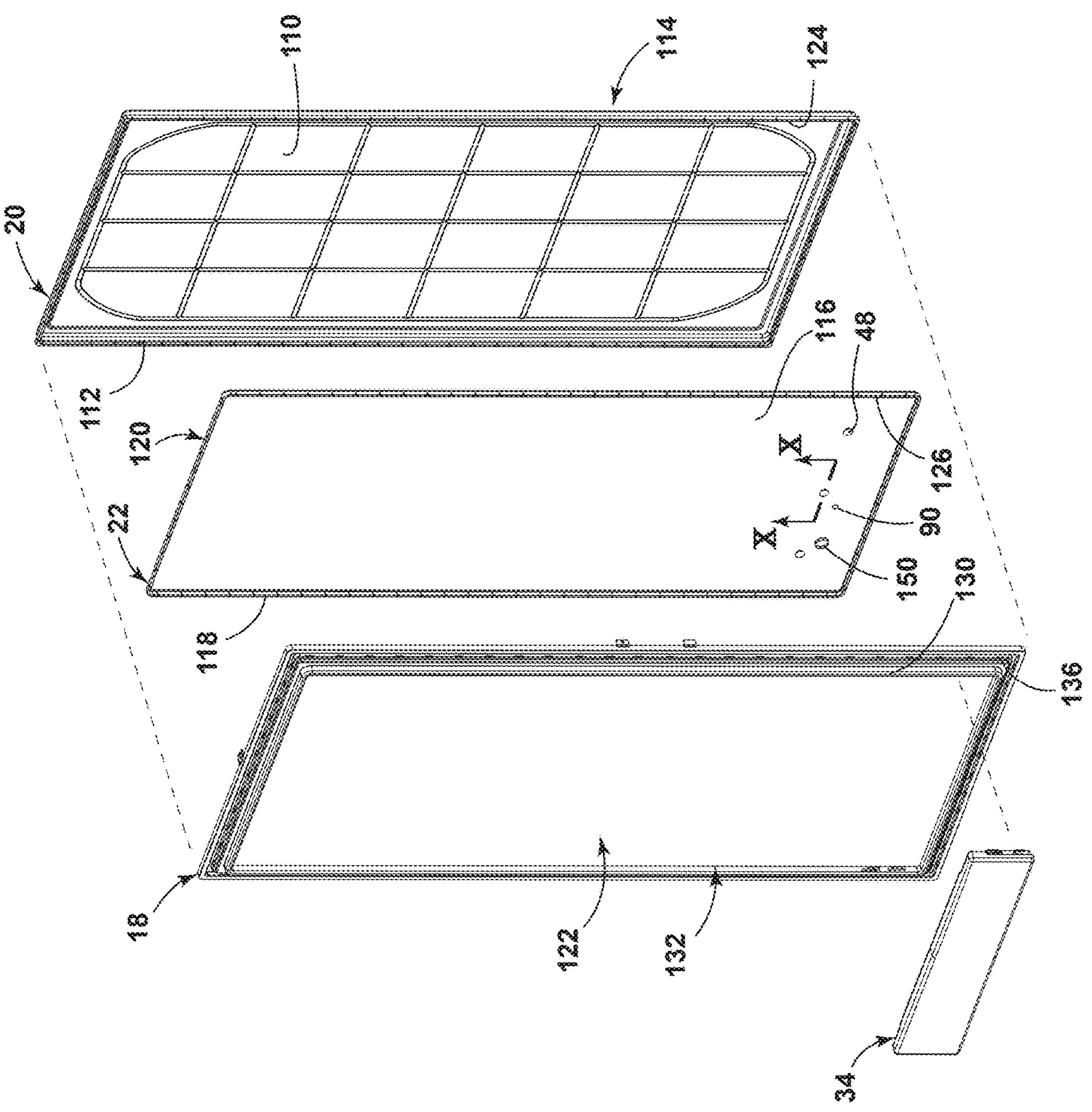
FIG. 3 is an exploded side perspective view of a door for a refrigeration appliance with a wrapper, a liner, a trim breaker, and a port cover, according to the present disclosure.

Referring to FIG. 3, the door wrapper 20 includes a main wall or an outside wall 110 and a border lip 112 extending around a perimeter 114 of the outside wall 110. The border lip 112 may extend substantially perpendicular from the main wall 110. Similarly, the door liner 22 includes a main wall or an inside wall 116 and a border lip 118 extending around a perimeter 120 of the main wall 110. The border lip 118 may extend substantially perpendicular to the main wall 116.

Figure 4:
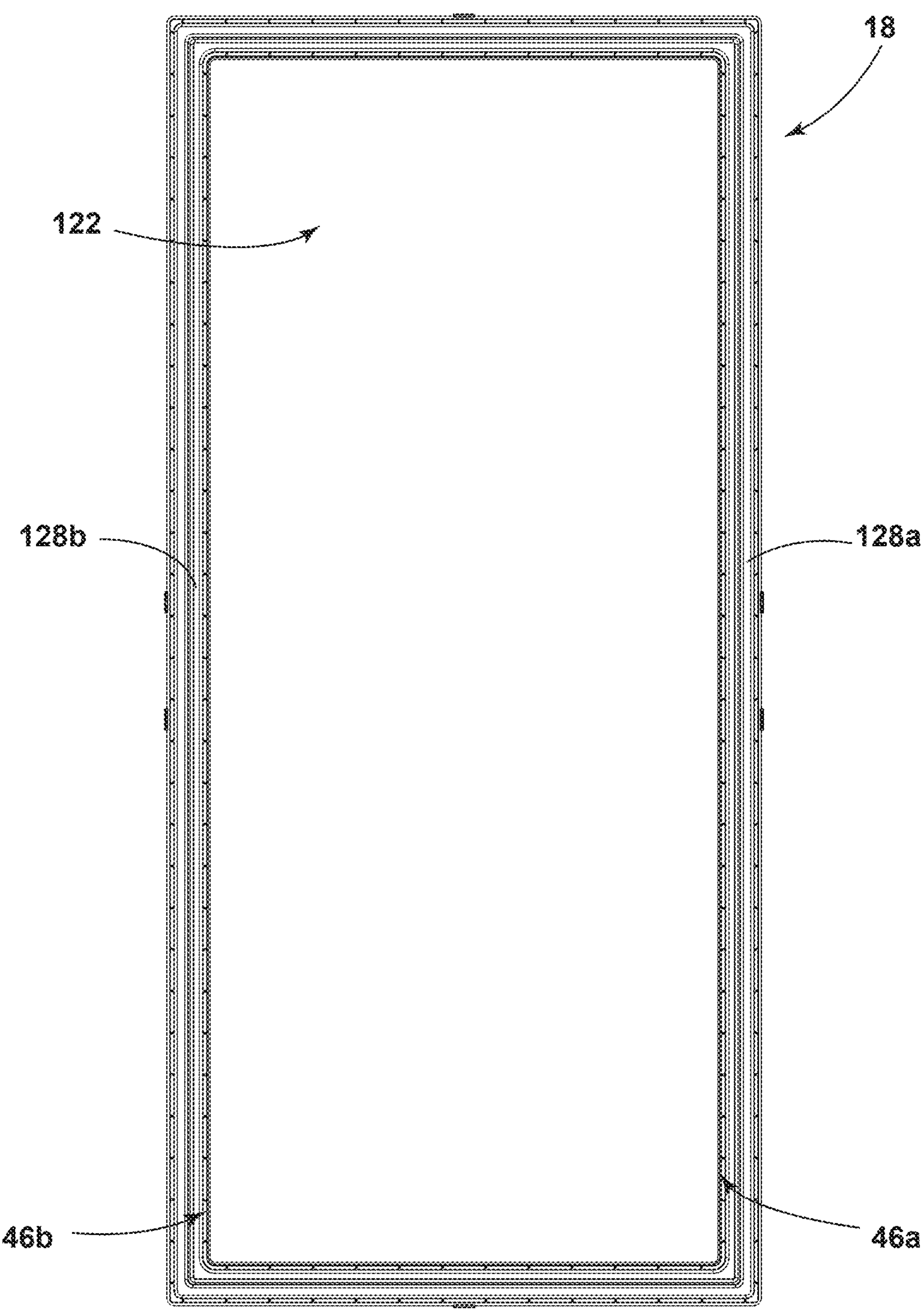
FIG. 4 is a rear elevational view of the trim breaker of FIG. 3, according to the present disclosure.

Referring still to FIG. 3, as well as FIG. 4, the trim breaker 18 generally couples the door wrapper 20 and the door liner 22 to form the appliance door 16. The trim breaker 18 has a generally rectangular shape, however, it is contemplated that other geometric shapes known in the art may be used. The trim breaker 18 defines an aperture 122 that partially defines the insulation cavity 24 when coupled to the door wrapper 20 and the door liner 22. It is contemplated that the trim breaker 18 may be coupled to an edge 124 of the door wrapper 20 and/or an edge 126 of the door liner 22. The edges 124, 126 generally extend along the border lips 112, 118 of the door wrapper 20 and the door liner 22, respectively.

The trim breaker 18 may include grooves **128*a*, 128*b*, which may include a wrapper groove 128*a* and a liner groove 128*b*, configured to receive the edges 124, 126 of the door wrapper 20 and the door liner 22, respectively. The grooves 128*a*, 128*b* generally extend around a perimeter of the trim breaker 18. In various implementations, a single groove 128*a*, 128*b* may be used to couple to the edges 124, 126 of the door wrapper 20 and the door liner 22. An adhesive is generally disposed in the grooves 128*a*, 128*b* to couple the trim breaker 18 to the edges 124, 126 of the door wrapper 20 and the door liner 22. The adhesive may be configured to reduce or prevent air infiltration to the insulation cavity 24**.

The trim breaker 18 may include an aperture or perimeter wall 130 extending from the trim breaker 18 in a direction opposite a face where the grooves **128*a*, 128*b* are defined and around a perimeter 132 of the aperture 122. Stated differently, the perimeter wall 130 partially defines the aperture 122 of the trim breaker 18 and extends away from the door liner 22 when the door liner 22 is coupled to the trim breaker 18. The perimeter wall 130 may be configured to be received within an opening 134 defined by the cabinet 12 for the compartment 14 when the appliance door 16 is sealing the compartment 14. The trim breaker 18 may also include a gasket groove 136 extending around the perimeter 120 of the trim breaker 18 and adjacent to the perimeter wall 130. The gasket groove 136 may be configured to couple a gasket to the appliance door 16, which can assist in sealing the compartment 14 when the appliance door 16** is closed.

Figure 5:
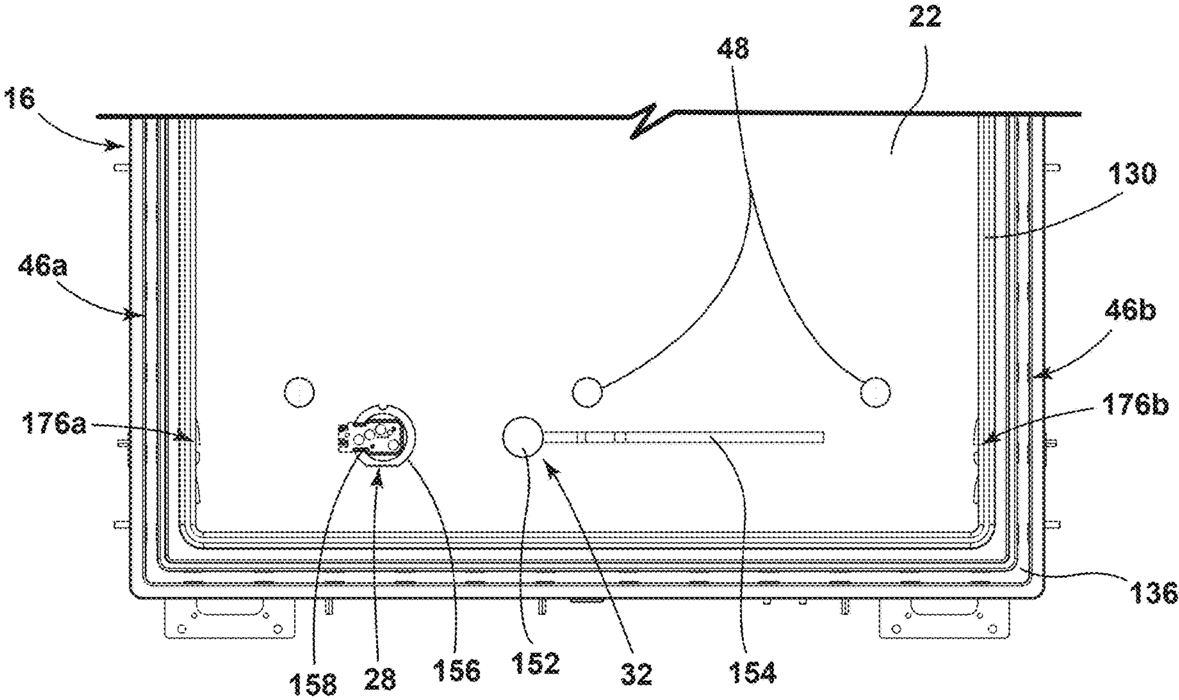
FIG. 5 is a partial rear elevational view of an appliance door including a sensor assembly and a vacuum port assembly, according to the present disclosure.

Referring to FIGS. 3 and 5, the door liner 22 defines the vacuum port 90 and a sensor port 150, both of which open into and are in fluid communication with the insulation cavity 24. The sensor port 150 is generally defined in the door liner 22 proximate to the vacuum port 90. The vacuum port assembly 32 and the sensor assembly 28 are generally in fluid communication with the insulation cavity 24 through the vacuum port 90 and the sensor port 150, respectively. The at least partial vacuum 26 is typically defined by evacuation of fluid (e.g., air) from the insulation cavity 24 through the vacuum port 90 via the vacuum port assembly 32. The vacuum port assembly 32 may include a coupling structure 152 to engage the door liner 22 and a servicing tube 154 to expel gas. The vacuum port assembly 32 is in fluid communication with the insulation cavity 24 via the vacuum port 90 to expel gas from the insulation cavity 24 via the servicing tube 154.

The sensor assembly 28 is configured to sense a pressure within the insulation cavity 24 (e.g., an internal pressure) during the evacuation process, as well as monitor the pressure during the life of the appliance door 16. The sensor assembly 28 may include a sensor base 156 to engage the door liner 22 over the sensor port 150 and a housing 158. The housing 158 may include a connector and contain various electronic or mechanical components, including a sensor, configured to sense the pressure within the insulation cavity 24.

Referring to FIGS. 6-13, the port cover 34 may be selectively coupled to the appliance door 16 over the sensor assembly 28 and the vacuum port assembly 32 to conceal the vacuum port assembly 32 and sensor assembly 28 while allowing access to each to service or monitor the pressure in the appliance door 16. The port cover 34 includes the base 36 and the cover assembly 50. The base 36 generally includes a plurality of walls 170, which may include a first side wall **170*a*, a second side wall 170*b*, a top wall 170*c*, and a bottom wall 170*d*, forming a perimeter 172 of the base 36. The first side wall 170*a* may extend along the first side 42*a* of the base 36, and the second side wall 170*b* may extend along the second side 42*b* of the base 36. The base 36 may also include an outside wall 174 extending between the plurality of walls 170. The walls 170 generally extend from the door liner 22 to the outside wall 174 when the port cover 34 is coupled to the appliance door 16. The outside wall 174 extends parallel or substantially parallel to the door liner 22 when the port cover 34 is coupled to the liner 22. It is contemplated that the base 36 may have a hollow interior. It is also contemplated that the base 36 may have a solid interior where the outside walls 174** are configured as an outside surface.

The locking features 40 may be defined on the walls 170 on opposing sides 42*a*, 42*b* of the base 36. For example, as illustrated the locking features 40 are defined on the side walls 170*a*, 170*b*. The locking features 40 generally correspond to engagement features 176, which may include a first engagement feature 176*a* and a second engagement feature 176*b*, defined on the trim breaker 18. The engagement features 176 may be defined on or by the perimeter wall 130 and on the opposing sides 46*a*, 46*b* of the trim breaker 18. The opposing side walls 46*a*, 46*b* of the trim breaker are lateral sides of the trim breaker 18 such that the port cover 34 extends across the width of the appliance door 16 when coupled to the trim breaker 18.

In various implementations, the base 36 may include the first locking feature 40*a* defined by the first side wall 170*a*, and the second locking feature 40*b* defined by the second side wall 170*b*. The first locking feature 40*a* may correspond to and engage the first engagement feature 176*a* defined on the first side 46*a* of the trim breaker 18, and second locking feature 40*b* may correspond to and engage the second engagement feature 176*b* defined on the second side 46*b* of the trim breaker 18. It is contemplated that the locking features 40 and the engagement features 176 may have different configurations and may be defined on other portions of the base 36 and the appliance door 16, respectively, without departing from the teachings herein.

Figure 7:
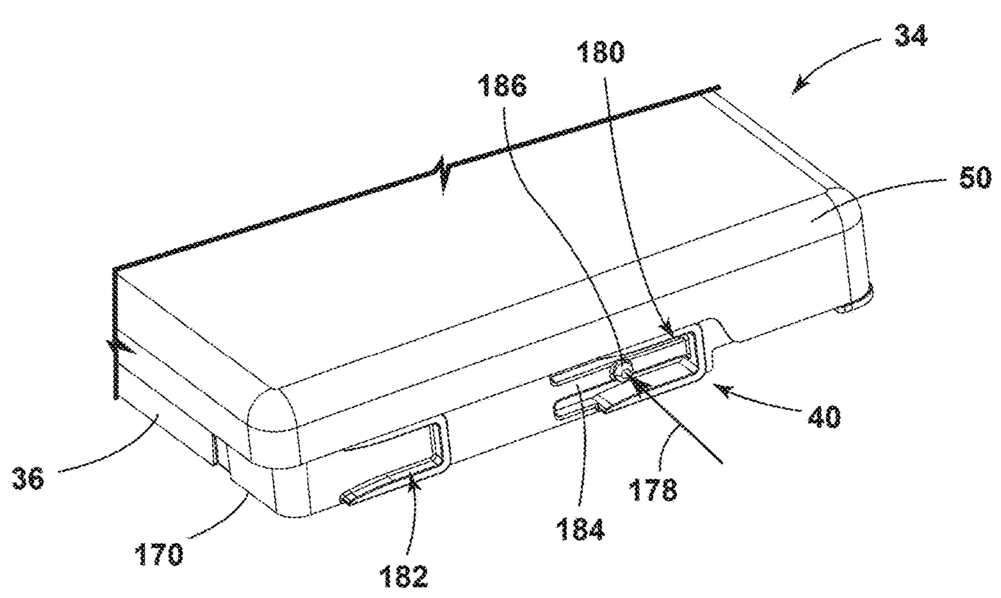
FIG. 7 is a partial side perspective view of a port cover with a locking feature, according to the present disclosure.
Figure 8:
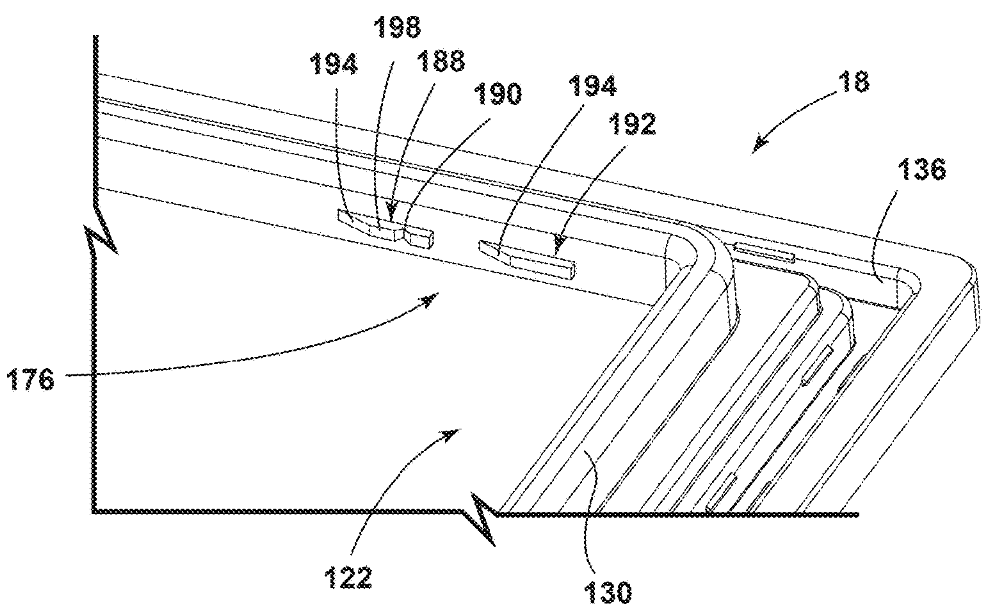
FIG. 8 is a partial side perspective view of a trim breaker with an engagement feature, according to the present disclosure.
Figure 9:
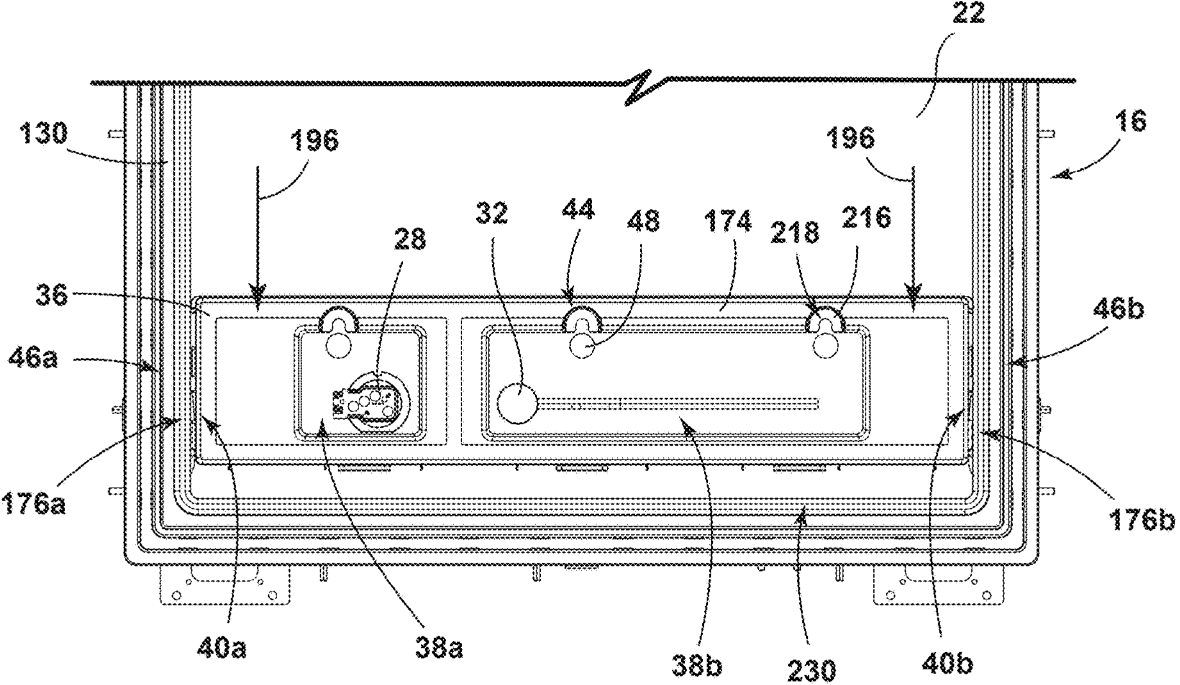
FIG. 9 is a partial rear elevational view of an appliance door including a sensor assembly, a vacuum port assembly, and a base of a port cover uncoupled from the appliance door, according to the present disclosure.

Referring to FIGS. 7-9, the locking features 40 are generally configured to slidably engage with the engagement features 176 of the trim breaker 18. The locking features 40 and the engagement features 176 are configured to securely couple the port cover 34 to the appliance door 16 during standard operation and use of the appliance 10 while still allowing for the removal of the port cover 34 for selective access to the sensor assembly 28 and/or the vacuum port assembly 32. In a coupling process of the base 36 to the trim breaker 18, the base 36 may generally be placed against the door liner 22 and oriented such that the locking features 40 will engage the engagement features 176 of the trim breaker 18 when slid or actuated in a direction shown by arrow 178 and illustrated as a downward direction. As the base 36 is slid along the door liner 22, the locking features 40 engage with or couple to the engagement features 176, thus, coupling the base 36 to the trim breaker 18.

In various implementations, the locking features 40 of the base 36 may include an upper slot 180, a lower slot 182, and a resilient member 184 with an engagement protrusion or knob 186. The engagement features 176 of the trim breaker 18 may include an upper guide 188 defining an engagement detent or recess 190 and a lower guide 192. The upper slot 180 and the lower slot 182 of the locking features 40 are generally configured to engage or slide over the upper guide 188 and the lower guide 192, respectively, of the engagement features 176. The upper and lower guides 188, 192 direct and guide the base 36 during the coupling process to the trim breaker 18. The upper guide 188 and the lower guide 192 may include sloped surfaces 194 to assist in engaging and aligning the upper and lower slots 180, 182 during the coupling process. While one side of the trim breaker 18 and one side of the base 36 are shown in FIGS. 7 and 8, the locking features 40 and the engagement features 176 may be mirrored or identical on the opposing side of the base 36 and the trim breaker 18, respectively.

The resilient member 184 is generally configured to allow for the engagement knob 186 to be actuated or pushed toward an interior portion of the base 36 (in the direction of arrow 196) while being biased away from the interior portion (opposing direction of arrow 196). During the coupling process, the engagement knob 186 engages the sloped surface 194 and a flat surface 198 of the upper guide 188. As the engagement knob 186 slides over the surfaces 194, 198 of the upper guide 188, the biasing force of the resilient member 184 is overcome, allowing for the engagement knob 186 to be pushed toward an interior portion of the base 36. Once the engagement knob 186 reaches the engagement recess 190, the biasing force of the resilient member 184 pushes the engagement knob 186 into the engagement recess 190, thus securing the base 36 to the trim breaker 18.

The base 36 may be uncoupled from the trim breaker 18 by generally reversing the coupling process. The base 36 may be slid or actuated in the direction opposite that shown by arrow 178. The biasing force of the resilient member 184 may be overcome during the actuation of the base 36 allowing for the engagement knob 186 to be disengaged from the engagement recess 190, thus allowing the base 36 to be uncoupled from the trim breaker 18. The engagement knob 186 may be rounded allowing for the knob 136 to slide out of the engagement recess 190. The engagement recess 190 may also have sloped or rounded sides so that the engagement knob 186 may slide out of the recess 190.

The resilient member 184 may be defined by the base 36 or separately constructed and coupled to the base 36. In implementations where the resilient member 184 is defined by the base 36, the material of the base 36 generally imputes the biasing force of the resilient member 184. The base 36 may be constructed of a variety of materials, including plastics, plastic mixes, metals, metal alloys, or other materials or combinations of materials allowing for the biasing and elastic deformation of the resilient member 184. In implementations where the resilient member 184 is separately constructed, the base 36 may be constructed of the same materials discussed above and may also be constructed of materials that would not impute a biasing force to the resilient member 184. It is contemplated that other configurations of the locking features 40 and the engagement features 176 may be used to couple the port cover 34 to the appliance door 16. As such, the locking features 40 and the engagement features 176 are not limited to the configurations illustrated.

Figure 6:
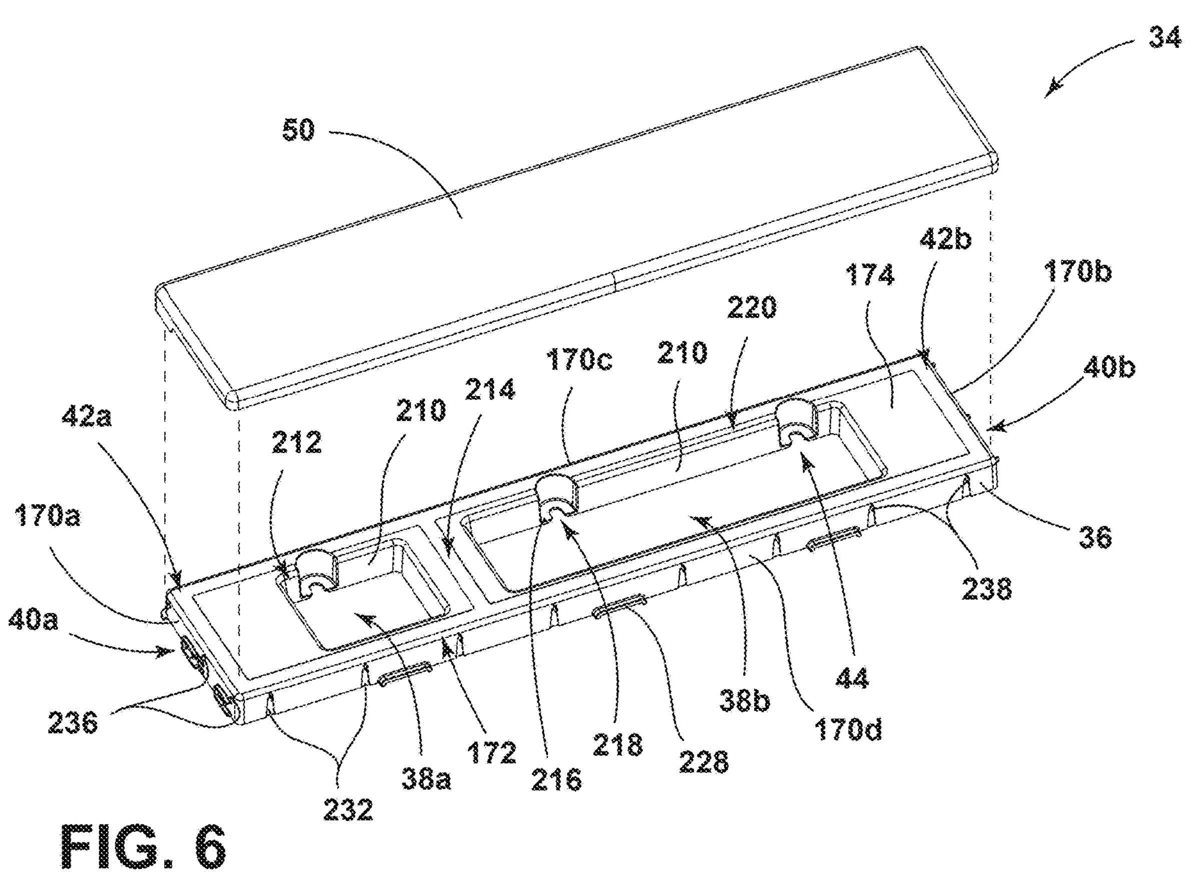
FIG. 6 is an exploded side perspective view of a port cover with a base and a cover assembly, according to the present disclosure.

Referring to FIGS. 6 and 9, the base 36 defines the openings 38 to receive the sensor assembly 28 and/or the vacuum port assembly 32. In other words, when the base 36 is coupled to the door liner 22, the sensor assembly 28 and the vacuum port assembly 32 are disposed in the respective openings 38 and generally do not extend beyond the outside wall 174 of the base 36. The openings 38 allow for the port cover 34 to be disposed over the sensor assembly 28 and/or the vacuum port assembly 32 to conceal and protect these components.

The openings 38 are generally configured to allow for the port cover 34 to be coupled to and uncoupled from the appliance door 16. The openings 38 may be larger than the sensor assembly 28 and/or the vacuum port assembly 32 allowing for the base 36 to be actuated in the direction of arrow 196 during the coupling of the base 36 to the trim breaker 18, as well as the direction opposite arrow 196 for uncoupling the port cover 34. The openings 38 are also configured to allow for the actuation of the base 36 in the direction opposing arrow 196 for the uncoupling process. The openings 38 extend through the outside wall 174 of the base and are defined by opening walls 210 extending around a perimeter of each of the openings 38. The opening walls 210 extend from the outside wall 174 to or proximate to the door liner 22 when the port cover 34 is coupled to the appliance door 16. In implementations where the base 36 has the solid interior, the opening walls 210 are configured as an opening surface.

In implementations including both the sensor assembly 28 and the vacuum port assembly 32, the base 36 defines the sensor assembly opening 38*a* and the vacuum port assembly opening 38*b*. The sensor assembly opening 38*a* and the vacuum port assembly opening 38*b* may be separated by a cross-member 214 extending between the top wall 170*c* and the bottom wall 170*d* of the base 36. The opening walls 210 of the openings 38*a*, 38*b* and the outside wall 174 define the cross-member 214. It is contemplated that the openings 38 for the sensor assembly 28 and the vacuum port assembly 32 may be a single continuous opening allowing for both to be disposed therein.

In implementations of the base 36 without the cross-member 214 and having a single opening 38, there may be an increased efficiency in manufacturing and assembling by providing more space for aligning the base 36 during the coupling process. Additionally, the increase in space may allow for increased access to the sensor assembly 28 and/or the vacuum port assembly 32 during manufacturing or servicing. Alternatively, in implementations of the base 36 with the cross-member 214 and having multiple openings 38*a*, 38*b*, the cross-member 214 may increase the structural rigidity of the base 36 and the appliance door 16. The increased rigidity of the base 36 from the cross-member 214 may also provide for increased protection of the sensor assembly 28 and/or the vacuum port assembly 32 when the cover assembly 50 is coupled to the base 36, as discussed herein.

The base 36 may also include or define the stud locators 44 to couple the port cover 34 to the appliance door 16. The studs locators 44 may be used with or without the locking features 40. The stud locators 44 each generally include a locator wall 216 defining a slot 218. The locator walls 216 may extend parallel or substantially parallel to the door liner 22 when the port cover 34 is coupled to the appliance door 16. The locator walls 216 may also be angled relative to the door liner 22 when the port cover 34 is coupled to the appliance door 16. For example, outer edges of the locator walls 216 may be spaced from the door liner 22 while inner edges of the locator walls 216 may be proximate to the door liner 22, or vice versa. In some examples, the stud locators 44 may be recessed in the opening walls 210 along an upper portion 220 of the perimeters 212 of the openings 38. The locator walls 216 may extend between the opening walls 210 forming the recess. In other examples, the stud locators 44 may be defined as recesses in the walls 170 of the base 36 or extend into the openings 38 or out from the walls 170. It is also contemplated that the stud locators 44 may include an aperture instead of the slots 218.

Figure 10:
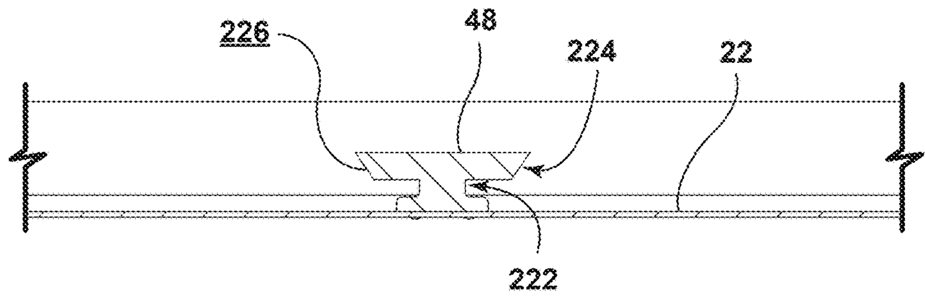
FIG. 10 is a partial cross-sectional view of the liner of the door with a stud of FIG. 3, taken along line X-X, according to the present disclosure.

Referring to FIGS. 5, 9, and 10, the appliance door 16 may include the studs 48 coupled to and extending from the door liner 22. The studs 48 may be coupled to the door liner 22 by being welded thereto or via an adhesive, which may be advantageous for retaining the vacuum 26 in the insulation cavity 24. The studs 48 may also be coupled to the door liner 22 via a fastener extending through the door liner 22 and configured to maintain the vacuum 26 within the insulation cavity 24. The stud locators 44 are configured to receive and engage the studs 48 coupled to the door liner 22. The studs 48 are generally coupled to the door liner 22 in positions that are vertically in line with the slots 218 during the coupling process. The studs 48 engage the stud locators 44 to couple the port cover 34 to the appliance door 16. As the base 36 is actuated along the direction of arrow 196 during the coupling process, the stud locators 44 engage the studs 48.

The studs 48 may include a stem 222 coupled to the door liner 22 and a fitment portion or retention portion 224 extending from the stem 222. The stem 222 may engage or be positioned in the slot 218 of the stud locators 44. The fitment portion 224 may engage the locator wall 216 of the stud locators 44. In some implementations, the fitment portion 224 may also engage the opening walls 210 extending around the stud locators 44. The fitment portion 224 of the studs 48 may be a frustoconical or tapered shape having a slanted surface 226, with a narrower width closer to the door liner 22. The slanted surface 226 is generally configured to pull or bias the port cover 34 toward the door liner 22 by engaging the locator wall 216 of the stud locators 44. The biasing of the port cover 34 may reduce or minimize a gap between the port cover 34 and the door liner 22. The studs 48 are not limited to the frustoconical shape and may be other shapes configured to engage the stud locators 44 and couple the port cover 34 to the appliance door 16. In other implementations, the studs 48 may be a post configured to couple to a fastener, such as a bolt, to bias the port cover 34 toward the door liner 22.

Referring again to FIG. 5, the base 36 may include extensions or tabs 228 extending away from the bottom wall 170*d*. In some implementations, the tabs 228 may engage a lower portion 230 of the perimeter wall 130 of the trim breaker 18. Such engagement of the tabs 228 and the trim breaker 18 may assist in spacing and positioning the base 36 relative to the trim breaker 18 to allow for the cover assembly 50 to be coupled to the base 36, as discussed herein. Additionally, the space provided by the tabs 228 may allow for a user to grip the port cover 34 proximate to the door liner 22 and actuate the port cover 34 in the opposite direction of arrow 196, which can assist in the efficiency of the uncoupling process of the port cover 34. The tab 228 may assist in the base 36 being level with the lower portion 230 of the perimeter wall 130 of the trim breaker 18. Additionally or alternatively, the tabs 228 may be received by a slot or receiving slot defined by the trim breaker 18 along the lower portion 230 of the perimeter wall 130. The receiving slot may bias the base 36 toward the door liner 22 when the base 36 is coupled to the door liner 22. The receiving slots may also assist in the alignment of the base 36 with the trim breaker 18. The base 36 may also include indents or ribs 232 on the walls 170. The indents 232 may provide for an increase in rigidity or strength of the base 36.

Referring to FIGS. 6 and 11-13, the cover assembly 50 is generally configured to couple to the base 36 and extend over the openings 38 to conceal and protect the sensor assembly 28 and/or the vacuum port assembly 32. The cover assembly 50 may be selectively and independently coupled to the base 36 and, consequently, the door liner 22. The cover assembly 50 may be coupled to the base 36 using fasteners, engagement features, or adhesives. In implementations using an adhesive, the adhesive may be disposed between the outside wall 174 and/or the walls 170 of the base 36 and the cover assembly 50.

In certain implementations, the cover assembly 50 may define first snap features 234, and the base 36 may define second snap features 236. The first snap features 234 are configured to align with and engage or mate with the second snap features 236 and couple the cover assembly 50 to the base 36. It is contemplated that other engagement features may be used to couple the cover assembly 50 to the base 36. This configuration with the snap features 234, 236 may allow selective removal of the port cover 34 as a whole by disengaging the locking features 40 from the engagement features 176, as well as allow selective removal of the cover assembly 50 by disengaging the snap features 234, 236 while leaving the base 36 coupled to the door liner 22. This may allow increased flexibility in accessing and/or servicing one or both of the sensor assembly 28 and the vacuum port assembly 32.

The cover assembly 50 may also be configured to snugly fit the base 36 without using fasteners, adhesives, or engagement features defined on the cover assembly 50, such as via an interference or frictional fit. The base 36 may include spacers 238 extending from the walls 174 around at least a portion of the perimeter 172 of the base 36. The spacers 238 may assist in providing the snug fit between the cover assembly 50 and the base 36 while allowing the formation of a gap between the cover assembly 50 and the base 36 for efficient removal of the cover assembly 50. The gap provides space for the user to grip the cover assembly 50 and allows for some rotational movement of the cover assembly 50 relative to the base 36 during the removal of the cover assembly 50. The distance the spacers 238 extend away from the walls 170 of the base 36 can be adjusted to reduce or increase the engagement between the spacers 238 and the cover assembly 50. As illustrated, the spacers extend along the bottom wall **170*d* of the base 36. The spacers 238 may also be used in conjunction with the other discussed coupling methods between the cover assembly 50 and the base 36**.

Figure 11:
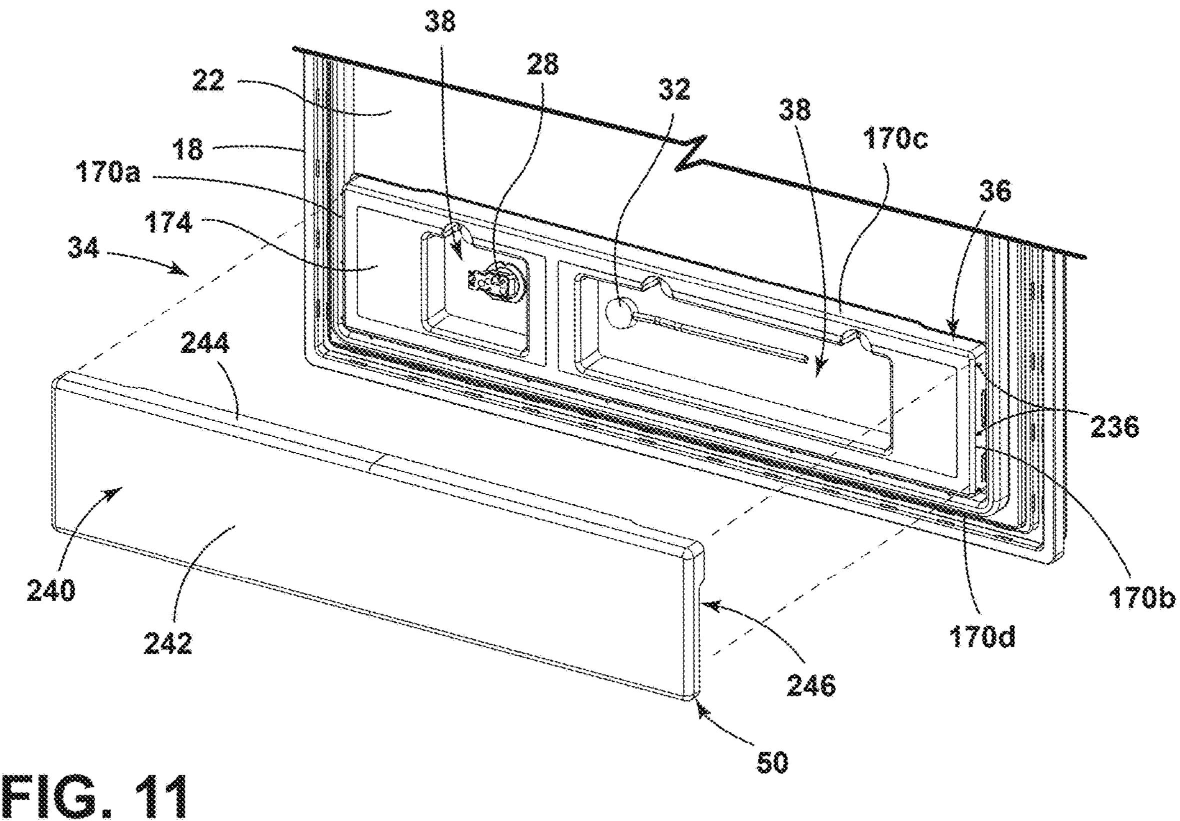
FIG. 11 is a partial side perspective and exploded view of an appliance door with a base of a port cover coupled to the appliance door and a cover assembly of the port cover uncoupled from the base, according to the present disclosure.
Figure 12:
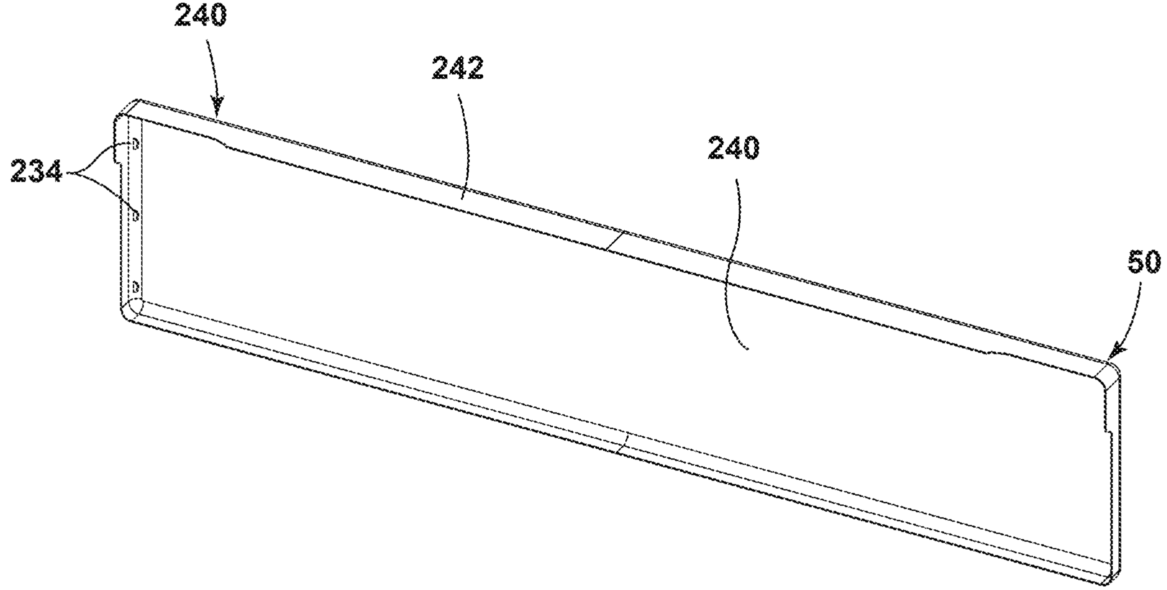
FIG. 12 is a side perspective view of a cover assembly of a port cover, according to the present disclosure.

As illustrated in FIGS. 6, 11, and 12, an implementation of the cover assembly 50 may be a continuous cover assembly 240, which may also be referred to as a continuous cover or a single body cover 240, having a cover portion 242 configured to extend over the openings 38 and a perimeter portion 244 extending perpendicular to the cover portion 242 and around the perimeter of the cover portion 242. The cover portion 242 extends over and abuts the outside wall 174 of the base 36 the cover assembly 50 is coupled thereto. The perimeter portion 244 may be configured to extend around and at least partially cover the walls 170 of the base 36 when the cover assembly 50 is coupled to the base 36. The perimeter portion 244 may also include cutouts 246 around the locking features 40 of the base 36. Stated differently, the cover assembly 50 forms a continuous surface or unitary body configured to extend over the openings 38 and around the perimeter of the base 36.

As illustrated, the perimeter portion 244 defines the first snap features 234 to couple the continuous cover assembly 240 to the base 36. It is also contemplated that the continuous cover assembly 240 may be coupled to base 36 using any of the coupling methods discussed with reference to the cover assembly 50 generally herein. The continuous cover assembly 240 may be constructed of plastics, plastic mixes, metals, metal alloys, or other materials or combinations of materials. The continuous cover assembly 240 may be formed by stamping, press baking, injection molding, welding corners, grinding, polishing, or other methods or combinations of methods suitable for forming the continuous cover assembly 240.

The continuous cover assembly 240 may increase efficiency both during manufacturing and servicing of the door 16. The continuous cover assembly 240 reduces the number of components to be formed and assembled during manufacturing. The continuous cover assembly 50 may also be produced with materials more conducive to selective removal during servicing of the appliance door 16.

Figure 13:
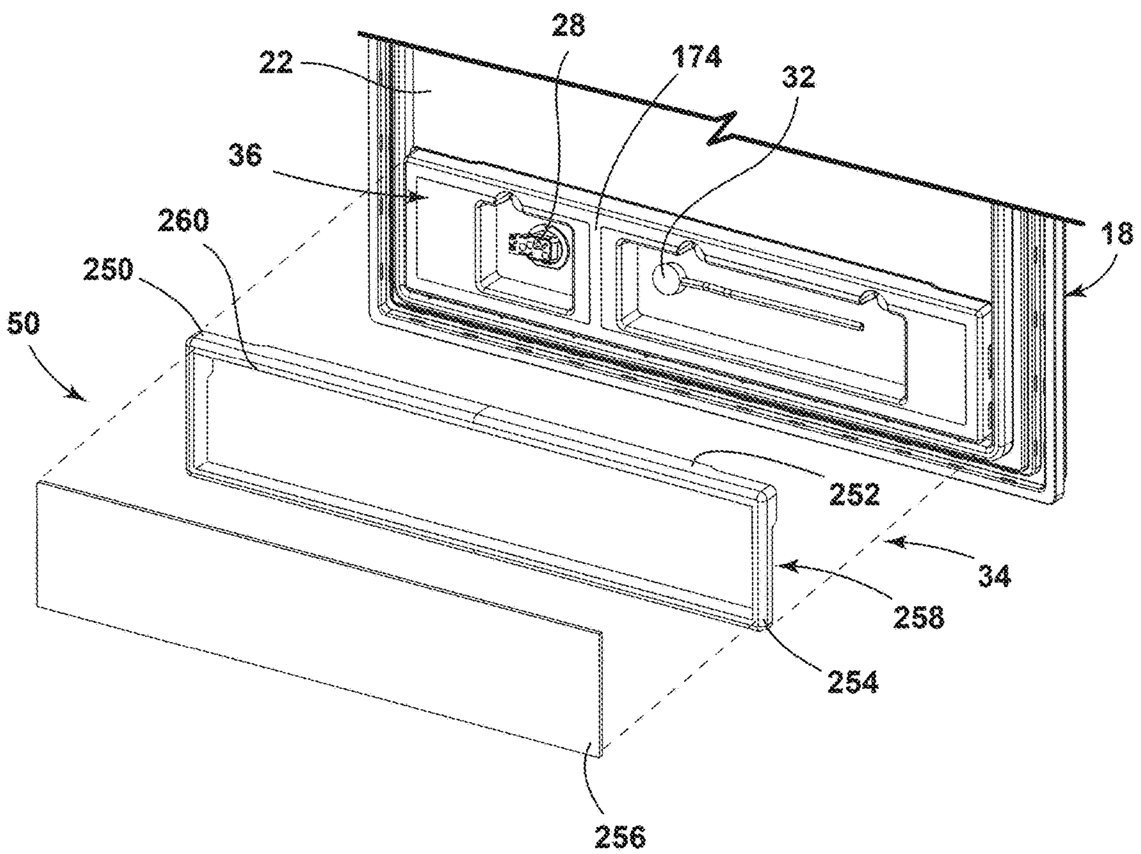
FIG. 13 is a partial side perspective and exploded view of an appliance door with a base of a port cover coupled to the appliance door and a cover assembly of the port cover uncoupled from the base, according to the present disclosure.

As illustrated in FIG. 13, an implementation of the cover assembly 50 may include a perimeter frame or a frame 250 having a side wall 252 and an outside wall 254 and a cover plate or cover panel 256 configured to extend over the openings 38 of the base 36. The cover plate 256 extends over the outside wall 174 of the base when the cover assembly 50 is coupled thereto. In some implementations, the cover plate 256 may also abut the outside wall 174 when coupled thereto. The side wall 252 of the perimeter frame 250 is configured to extend around and at least partially cover the walls 170 of the base 36 when coupled together. The side wall 252 of the perimeter frame 250 may include cutouts 258 around the locking features 40 of the base 36.

The outside wall 254 of the perimeter frame 250 may include a recess 260 configured to receive the cover plate 256 and form a flush engagement between the cover plate 256 and the perimeter frame 250. In other words, a surface of the perimeter frame 250 and a surface of the cover plate 256 are generally aligned or co-planar to form an outer surface of the cover assembly 50. The cover plate 256 and the perimeter frame 250 may be coupled together using an adhesive or fasteners, such as bolts, screws, or tabs. In implementations where an adhesive is used, the adhesive may be disposed between the outside wall 254 of perimeter frame 250 and the cover plate 256 or within the recess 260.

In various configurations, the perimeter frame 250 may define the first snap features 234 to couple the cover assembly 50 to the base 36. In other implementations, an adhesive may be disposed between the outside wall 174 of the base 36 and the perimeter frame 250 to couple the cover assembly 50 to the base 36. It is contemplated that any of the coupling methods discussed with reference to the cover assembly 50 generally herein may be used. The perimeter frame 250 and the cover plate 256 may be constructed of the same or different materials. The perimeter frame 250 may be constructed with plastics, plastic mixes, metals, metal alloys, or other materials or combinations of materials. The cover plate 256 may be constructed of plastics, plastic mixes, metals, metal alloys, glass, glass ceramics, ceramics, or other materials or combinations of materials.

The cover assembly 50 including the perimeter frame 250 and the cover plate 256 may allow for multiple materials to be used in the construction of the cover assembly 50. For example, the multiple materials may allow for the perimeter frame 256 to be constructed of a material more suitable for an adhesive and defining the first snap features 234, while the cover plate 256 may be constructed of a material more suitable for the adhesive and concealing the sensor assembly 28 and/or vacuum port assembly 32. The cover plate 256 may also be manufactured from materials that integrate or match other components of the appliance door 16, concealing or masking the port cover 34 when coupled to the appliance door 16.

In some implementations, the cover assembly 50 may also include a film or an applied skin. The film is generally configured to cover or change an outward appearance of the cover assembly 50. The film may be beneficial when the material or materials of the cover assembly 50 do not fully integrate or clash with the other materials of the appliance door 16. The film may also better obscure or hide the sensor assembly 28 and/or the vacuum port assembly 32 when the cover assembly 50 is constructed of a clear or opaque material.

In some implementations, the film may be applied to an exterior of the continuous cover assembly 240 and partially or substantially cover the continuous cover assembly 240. In other implementations, the film may be applied to an exterior surface of the cover plater 256. The film may also be separately applied to an exterior of the perimeter frame 250 to give an appearance of consistent materials when desired. The film may also be applied to an exterior of the perimeter frame 250 and the cover plate 256 to conceal any seams or gaps and/or create a consistent appearance.

Illustrated in FIGS. 14-17 is a second implementation of a port cover 300. The port cover 300 may be selectively coupled to the appliance door 16 over the sensor assembly 28 and the vacuum port assembly 32 to conceal the vacuum port assembly 32 and sensor assembly 28 while allowing access to each to service or monitor the pressure in the appliance door 16 similar to the configurations illustrated in FIGS. 6-13. The port cover 300 includes a base 302 and a cover assembly 304. The base 302 generally includes a base plate 310 that extends substantially parallel with the door liner 22 when coupled thereto and a plurality of walls 312 extending from the base plate 310. As illustrated, the plurality of walls 312 includes an upper wall 312*a*, a first lower wall 312*b*, a second lower wall 312*c*, and a third lower wall 312*d*, which aligns with a shape defined by the cover assembly 304 to orient the cover assembly 304 and engage the cover assembly 304 with the base plate 310. The walls 312 may extend perpendicular or substantially perpendicular from the base plate 310 and away from the door liner 22. It is contemplated that the plurality of walls 312 may extend at any angle from the base plate 310 to engage the cover assembly 304 without departing from the teachings herein.

Figure 14:
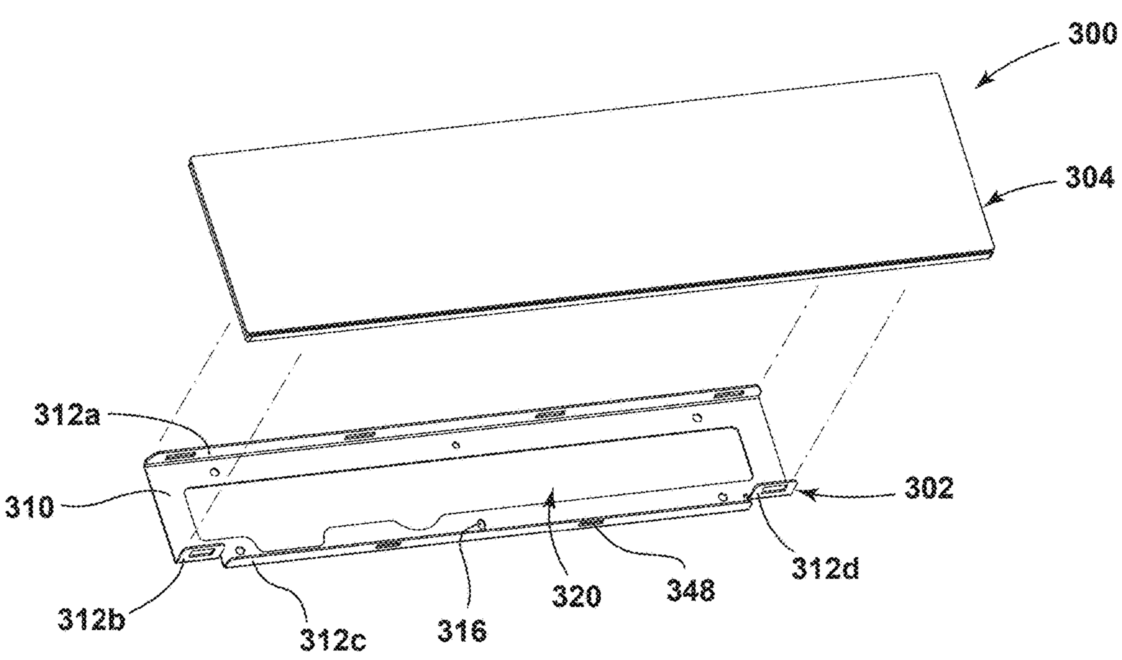
FIG. 14 is an exploded side perspective view of a port cover with a base and a cover assembly, according to the present disclosure.
Figure 15:
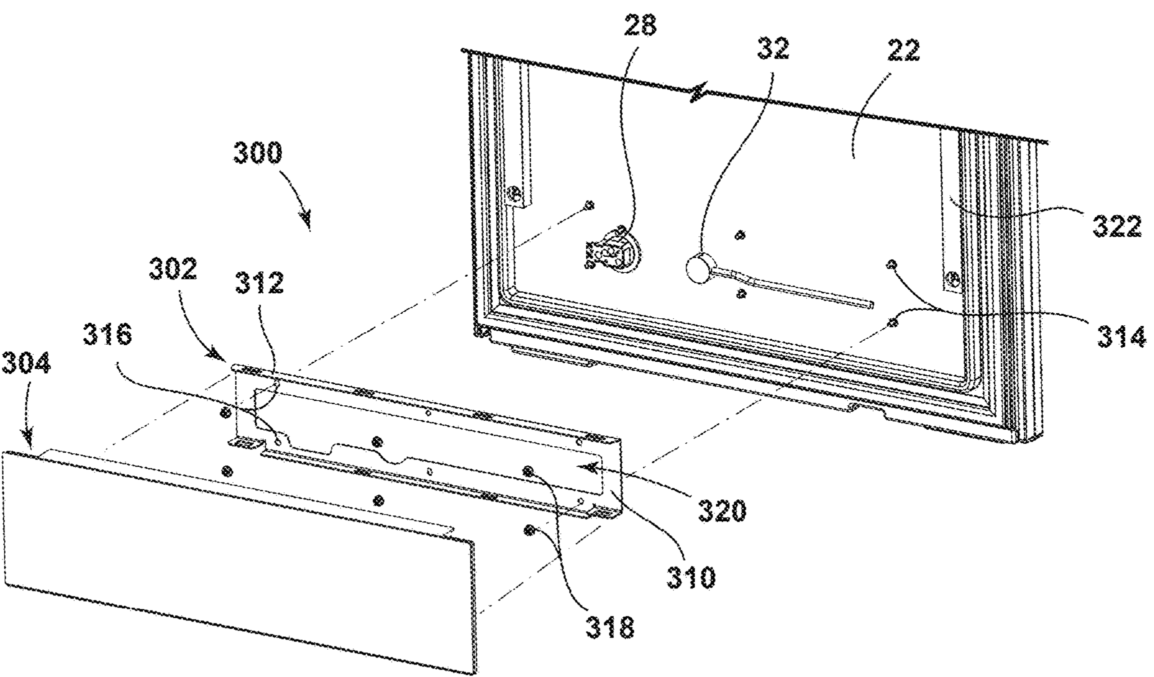
FIG. 15 is a partial side perspective and exploded view of an appliance door with a base and a cover assembly of the port cover uncoupled from the base, according to the present disclosure.
Figures 16, 17:
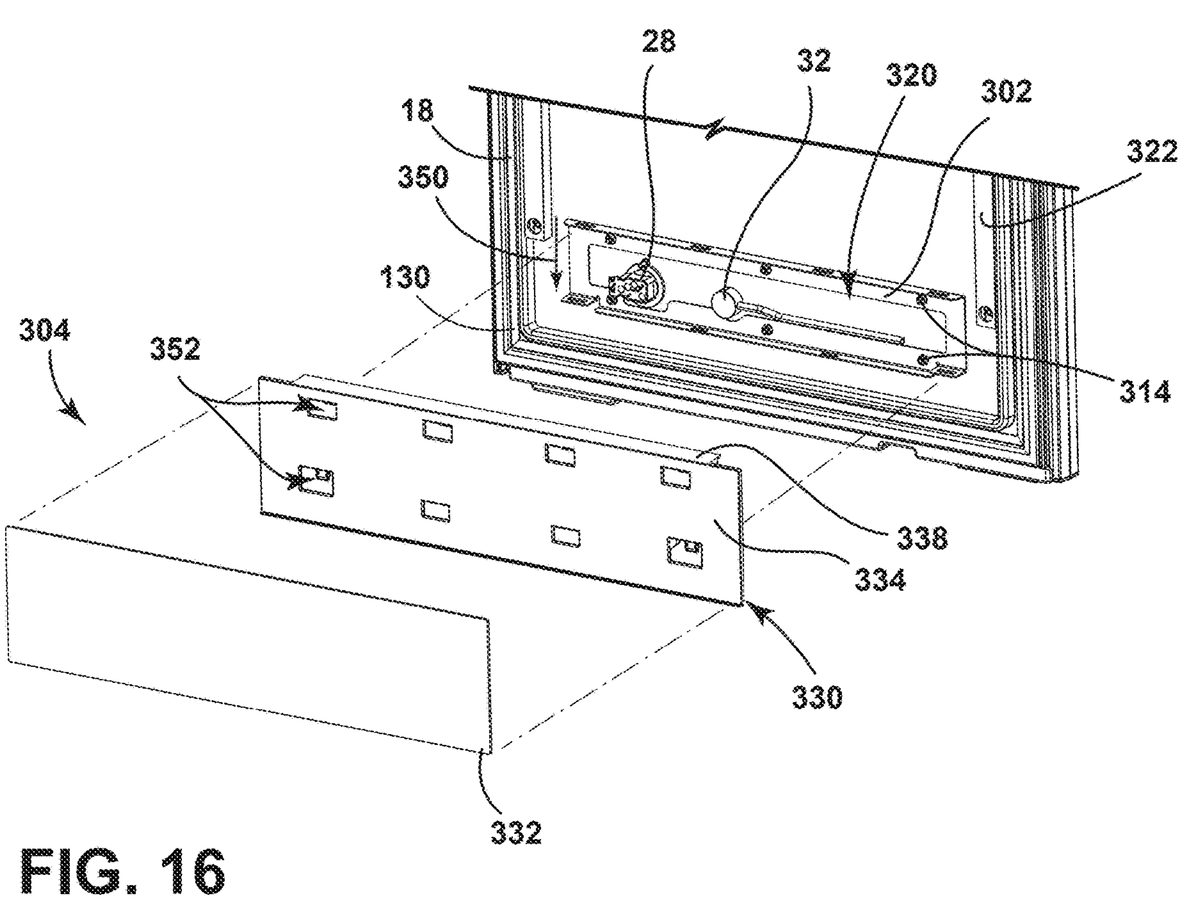
FIG. 16 is a partial side perspective and exploded view of an appliance door with a base of a port cover coupled to the appliance door and a cover assembly of the port cover uncoupled from the base, according to the present disclosure.
FIG. 17 is a side perspective view of a cover assembly of a port cover, according to the present disclosure.

Referring still to FIGS. 14-16, the appliance door 16 may include a plurality of studs 314 coupled to and extending from the door liner 22. The studs 314 may be coupled to the door liner 22 by being welded thereto, via an adhesive, or any other method discussed herein. As illustrated, the studs 314 are configured as posts that include or define threads. However, the studs 314 may include a fitment portion, as discussed herein, to bias the base 302 toward the door liner 22 or be configured to engage a fastener to couple the base 302 to the door liner 22.

The base 302 may include a plurality of stud apertures 316, which may also be referred to as stud slots 316 or stud connectors 316, through which the studs 314 are configured to extend. The stud apertures 316 are generally defined by the base plate 310 of the base 302. The base 302 may be slid onto the studs 314 to couple the base 302 to the appliance door 16. In this way, the base 302 is moved for the studs 314 to extend through the stud apertures 16 until the base 302 abuts the door liner 22. As illustrated, the base 302 is coupled to the appliance door 16 via the studs 314 extending through the stud apertures 316 and a plurality of nuts 318 coupled to the studs 314, respectively. The nuts 318 are configured to engage the threads of the studs 314 to retain the base 302 on the appliance door 16, generally preventing the base 302 from being uncoupled from the appliance door 16 when engaged with the studs 314. The nuts 318 can be unthreaded from the studs 314, allowing for the base 302 to be slidably removed from the studs 314. It is contemplated that the base 302 may be coupled to the appliance door 16 via the studs 314 and other fasteners, such as pins or bolts, or other coupling features over the studs 314, such as caps or clips.

The base 302 defines an opening 320 to receive the sensor assembly 28 and/or the vacuum port assembly 32. In other words, when the base 302 is coupled to the door liner 22, the sensor assembly 28 and the vacuum port assembly 32 are disposed in the opening 320 and generally do not extend beyond the walls 312 of the base plate 310 the base 302. The opening 320 allows for the port cover 34 to be disposed over the sensor assembly 28 and/or the vacuum port assembly 32 to conceal and protect these components. The opening 320 is configured to allow the base 302 to be slid onto the studs 314 over and around the sensor assembly 28 and/or the vacuum port assembly 32. In the illustrated example the base 302 is constructed of a metal or a metal alloy. The single opening 320 provides for more efficient manufacturing of the base 302 constructed of the metal or metal alloy. However, it is contemplated that the base 302 may define separate openings 320 for each of the sensor assembly 28 and the vacuum port assembly 32. Additionally, it is contemplated that base 302 may be constructed of plastics, plastic mixes, metals, metal alloys, or other materials or combinations of materials without departing from the teachings herein. The base 302 may be formed by stamping, press baking, injection molding, welding corners, grinding, polishing, or other methods or combinations of methods suitable for forming the base 302.

It is contemplated that the base 302 may include any of the features discussed with reference to the base 36. Similarly, it is contemplated that the base 36 may include any of the features discussed with reference to base 302. For example, the base 302 may include the locking features 40 to engage the trim breaker 18 and/or a cover assembly 322 or a trim breaker cover assembly 322 coupled to the appliance door 16. The trim breaker assembly 322 may extend along at least a portion of a perimeter of the appliance door 16 and be configured to cover and/or conceal various components disposed on the perimeter of the appliance door 16.

Referring still to FIGS. 14-16, as well as FIG. 17, the cover assembly 304 is generally configured to couple to the base 302 and extend over the opening 320 to conceal and protect the sensor assembly 28 and/or the vacuum port assembly 32. The cover assembly 50 may be selectively and independently coupled to the base 302 and, consequently, the door liner 22. As illustrated, the cover assembly 304 includes a cover bracket 330 and a cover plate 332. It is contemplated that the cover assembly 304 can be a single continuous cover where the cover bracket 330 and the cover plate 332 are a single, integrated component without departing from the teachings herein.

The cover bracket 330 may include an outside wall 334 that extends parallel or substantially parallel to the door liner 22 when coupled to the door liner 22 via the base plate 310. The cover bracket 330 includes an inner surface 336 that is oriented toward the door liner 22, and a plurality of side walls 338. The side walls 338 may extend perpendicular or substantially perpendicular from the outside wall 334 to the base 302 when coupled thereto. The side walls 338 form a perimeter that is substantially similar to the perimeter of the base plate 310 of the base 302 to fit about or engage the side walls 338 of the base 302. The perimeter formed by the sidewalls 338 and the perimeter formed by the base plate 310 may assist with proper orientation and alignment of the cover bracket 330 relative to the base 302. For example, side walls 338 form a mating or corresponding shape as the lower walls 312*b*-312*d*. Moreover, the side walls 338 form a receiving space 340 or a recessed space 340 for the sensor assembly 28 and/or the vacuum port assembly 32 when the cover bracket 330 is positioned over and coupled to the base plate 310. The receiving space 340 and the side walls 338 are configured to allow for the cover bracket 330 to be coupled and uncoupled from the base 302, as discussed further herein.

In various configurations, the cover bracket 330 may include engagement features 342 configured to engage the base 302. The engagement features 342 may include snap extensions 344 extending from the side walls 338 of the cover bracket 330 and snap fasteners 346 coupled to the snap extensions 344. The snap extensions 344 provide support for the snap fasteners 346, which are configured to elastically deform toward the snap extensions 344. The snap fasteners 346 may engage snap apertures 348 or engagement apertures 348 defined by the walls 312 of the base 302. The snap fasteners 346 may be constructed of a material that imparts a biasing force away from the snap extensions 344 when the snap fasteners 346 are coupled thereto.

To couple the cover bracket 330 to the base 302, the engagement features 342 are aligned with the snap apertures 348. The cover bracket 330 is actuated in a direction shown by arrow 350, which is illustrated as a downward direction. During the actuation of the cover bracket 330, the biasing force of the snap fasteners 346 is overcome allowing for the snap fasteners 346 to deform or compress toward the snap extensions 344, allowing the snap extensions 344 and the snap fasteners 346 to be inserted and extend through the snap apertures 348 of the base 302. As the cover bracket 330 is engaged with the base 302, the biasing force of the snap fasteners 346 biases the fasteners 346 away from the snap extensions 344, engaging the base 302 to secure the cover bracket 330 to the base 302. To uncouple the cover bracket 330 from the base 302, the cover bracket 330 is actuated in a direction opposing the arrow 350. The actuation force imparted on the cover bracket 330 overcomes the biasing force of the snap fasteners 346 allowing for the cover bracket 330 to be uncoupled from the base 302. The fastener 346 may include one or more sloped or rounded surfaces configured to allow the engagement feature 342 to slide through the snap apertures 348 and more efficiently overcome the biasing force of the fastener 346.

To assist in coupling and uncoupling the cover bracket 330 from the base 302, the outside wall 334 may define a plurality of access apertures 352 corresponding to the engagement features 342. The access apertures 352 may assist with aligning the illustrated engagement features 342 with the snap apertures 348. Additionally, the access apertures 352 may allow for a tool or other device to be used to assist with biasing the snap fasteners 346 or overcoming the biasing of the snap apertures 346 (e.g., for removing the cover bracket 330 from the base 302). The engagement features 342 are not limited to the snap extensions 344 and snap fasteners 346 and may be other snap features or fasteners, such as bolts or screws, configured to selectively couple the cover bracket 330 to the base 302. The access apertures 352 may allow for access to the other engagement features 342 to allow, for example, tightening of a bolt or nut. In various implementations, the engagement feature 342 may be similar to the first and second snap features 234, 236 described herein.

Referring still to FIGS. 14-17, the outside wall 334 of the cover bracket 330 generally extends over the receiving space 340 to conceal and protect the sensor assembly 28 and/or the vacuum port assembly 32. The outside wall 334 may extend beyond the receiving space 340 and extend to opposing sides 46*a*, 46*b* of the trim breaker 18. The outside wall 334 is generally spaced from the door liner 22 and may extend over other components coupled to the appliance door 16. In implementations including the trim breaker cover assembly 322, the outside wall 334 may extend over the trim breaker cover assembly 322, and the cover assembly 304 may be substantially flush with the perimeter wall 130 of the trim breaker 18.

The cover plate 332 may be coupled to the cover bracket 330 using an adhesive or fasteners, such as bolts, screws, or tabs. In implementations where an adhesive is used, the adhesive may be disposed between the outside wall 334 of the cover bracket 330 and/or the cover plate 332. The outside wall 334 of the cover bracket 330 may also define a recess to receive the cover plate 332, similar to that discussed with reference to the cover assembly 50 herein. The recess may be configured such that the cover plate 332 is substantially flush with the non-recessed remainder of the outside wall 334. In some implementations, the cover plate 332 may be coextensive with the outside wall 334 of the cover bracket 330.

The cover bracket 330 and the cover plate 332 may be constructed of the same or different materials. For example, the cover bracket 330 may be constructed of plastic while the cover plate 332 is constructed of glass. The multiple materials allow for the material of the cover bracket 330 to be more suitable for engaging the base 302 and defining the features of the cover bracket 330 while the cover plate 332 may be constructed of a material more suitable for the adhesive and concealing the sensor assembly 28 and/or vacuum port assembly 32. The cover plate 332 may also be manufactured from materials that integrate or match other components of the appliance door 16, concealing or masking the port cover 300 when coupled to the appliance door 16.

The cover bracket 330 may be constructed of plastics, plastic mixes, metals, metal alloys, or other materials or combinations of materials. The cover bracket 330 may be formed by stamping, press baking, injection molding, welding corners, grinding, polishing, or other methods or combinations of methods suitable for forming the cover bracket 330. The cover plate 332 may be constructed of plastics, plastic mixes, metals, metal alloys, glass, glass ceramics, ceramics, or other materials or combinations of materials. The cover plate 332 may be formed by stamping, press baking, injection molding, welding corners, grinding, polishing, or other methods or combinations of methods suitable for forming the cover plate 332.

It is contemplated that the cover assembly 304 may include any of the features discussed with reference to the cover assembly 50. Similarly, it is contemplated that the cover assembly 50 may include any of the features discussed with reference to the cover assembly 304. For example, the cover assembly 304 may include the film or applied skin configured to cover or change the outward appearance of the cover assembly 304.

While the port cover 34, 300 including the base 36, 302 and the cover assembly 50, 304 is described with reference to the appliance door 16, it is not limited to use with the appliance door 16. It is contemplated that the port cover 34, 300 may be used with a variety of other vacuum insulated structures and panels, such as the appliance cabinet 12 or the second appliance door 70. Further, the sensor assembly 28, the vacuum port assembly 32, and the port cover 34, 300 are illustrated as arranged along the width of the door 16 at a lower or bottom portion of the door 16. However, it is contemplated that the sensor assembly 28, the vacuum port assembly 32, and the port cover 34, 300 may be arranged along a height or longitudinal extent of the door 16 or in other locations on the door 16.

Figure 18:
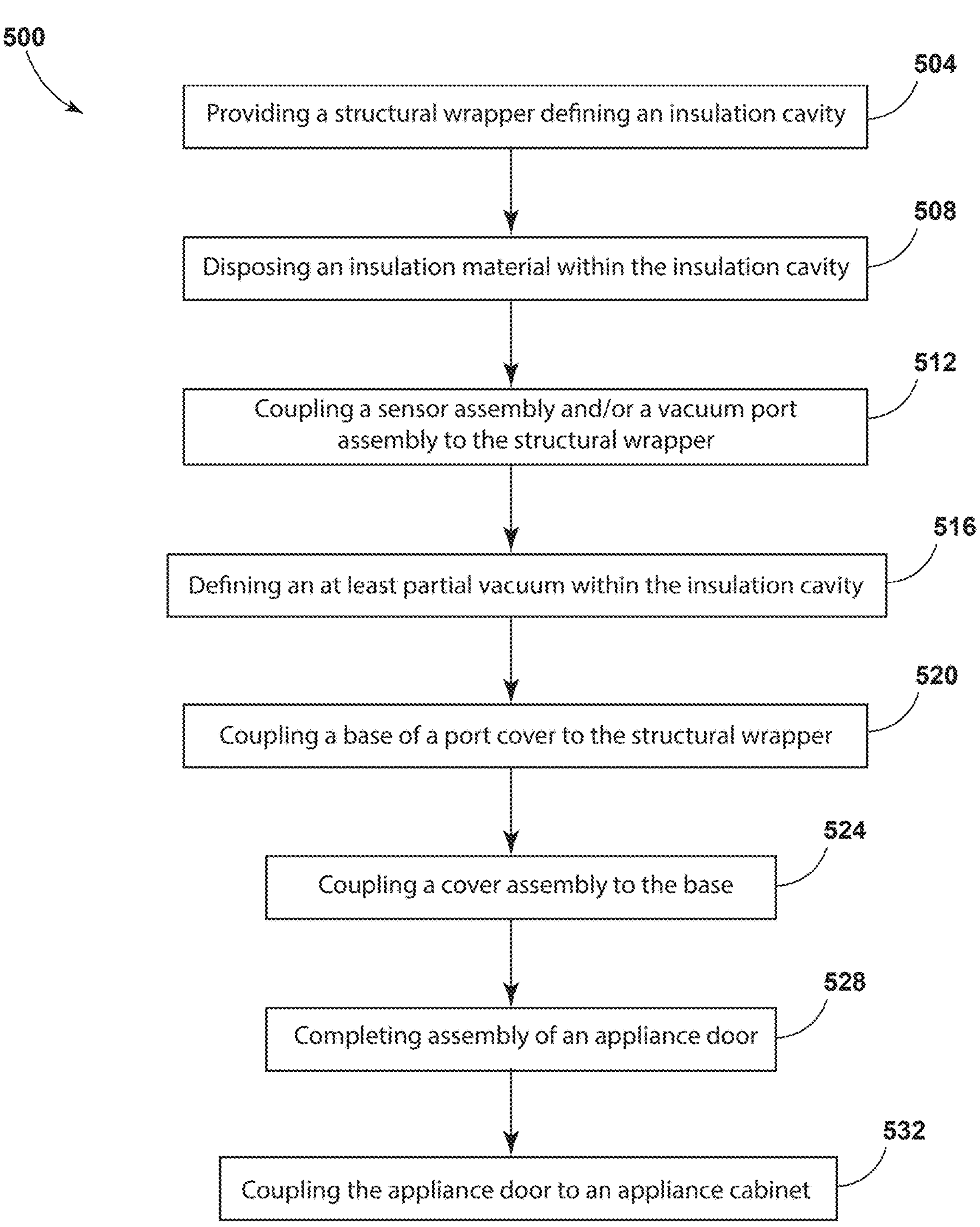
FIG. 18 is a flow diagram of a method of manufacturing an appliance, according to the present disclosure.

Referring to FIG. 18, with further reference to FIGS. 1-18, a flow diagram of a method 500 for manufacturing the appliance 10 is illustrated. The method 500 includes step 504 of providing the structural wrapper defining the insulation cavity 24. Step 504 may also include forming the structural wrapper by coupling the door wrapper 20 and the door liner 22 to the trim breaker 18 to define the insulation cavity 24. Step 504 may further include coupling the studs 48, 314 to the door liner 22. In step 508, the insulation material 80 may be disposed within the insulation cavity 24. In step 512, the sensor assembly 28 and/or the vacuum port assembly 32 may be coupled with the structural wrapper. The sensor assembly 28 may be coupled to the door liner 22 over the sensor port 150 and the vacuum port assembly 32 may be coupled to the door liner 22 over the vacuum port 90. In step 516, the at least partial vacuum 26 may be drawn in the insulation cavity 24 using the vacuum port assembly 32. Some or all of steps 504 through 316 may be repeated to form the second appliance door 70 and/or the appliance cabinet 12.

In step 520, the base 36, 302 of the port cover 34, 300 may be coupled to the structural wrapper. Coupling the base 36 to appliance door 16 may include engaging the locking features 40 with the engagement features 176 of the trim breaker 18. Coupling the base 36, 302 to the appliance door 16 may also include engaging the stud locators 44 or the stud apertures 316 with the studs 48, 314 coupled to door liner 22.

In step 524, the cover assembly 50, 304 may be coupled to the base 36, 302. An adhesive may be applied to the base 36 or the cover assembly 50. Alternatively, in at least one configuration, such as the configuration illustrated in FIG. 11 the first snap features 234 defined on the cover assembly 50 may be engaged with the second snap features 236 on the base 36. Step 524 may also include coupling the perimeter frame 250 with the cover plate 256. Alternatively, step 524 may include coupling the cover bracket 330 to the base 302, such as in the configuration illustrated in FIG. 14. The cover plate 332 may be coupled to the cover bracket 330. In step 528, assembly of the structural wrapper to form the appliance door 16 is completed, which may include adding handles, connectors for storage features, etc. In step 532, the appliance door 16 may be coupled to the cabinet 12 and the assembly of the appliance 10 is completed. The steps of the method 500 may be performed in any order, simultaneously, concurrently, repeated, omitted, etc. without departing from the teachings herein.

Use of the present device may provide a variety of advantages. For example, the port cover 34, 300 protects and covers the sensor assembly 28 and the vacuum port assembly 32 during operation of the appliance 10. The port cover 34, 300 allows for access to the sensor assembly 28 and the vacuum port assembly 32 by being selectively removable from the appliance door 16. The locking features 40 of the port cover 34 and the engagement features 176 of the trim breaker 18 allow for the port cover 34 to be securely coupled together while allowing for the port cover 34 to be uncoupled from the trim breaker 18. Moreover, the cover assembly 50, 304 can be selectively removed from the base 36, 302 to provide access to the sensor assembly 28 and the vacuum port assembly 32 without uncoupling the base 36, 302 from the door 16.

Furthermore, the frustoconical studs 48 coupled to the door liner 22 may bias the port cover 34 toward the door liner 22 and reduce a gap therebetween to more fully install and couple the port cover 34 to the door liner 22. Additionally, the base 36 improves alignment between the port cover 34 and the trim breaker 18. Moreover, the two-part construction of the port cover 34, 300 may increase the efficiency of the manufacturing process of the appliance door 16 by allowing for the base 36, 302 to be coupled to the door liner 22 while still allowing access to the sensor assembly 28 and the vacuum port assembly 32. The port cover 34, 300 being selectively coupled to the appliance door 16 also increases efficiency for servicing or checking the pressure of the appliance door 16, as well as drawing more air from the insulation cavity 24. In implementations where the cover assembly 50, 304 is removable from the base 36, 302 (e.g., using the first and second snaps 230, 232 or using the engagement feature 242), which may also increase the efficiency of servicing the appliance door 16. In implementations including the access apertures 352, the access apertures 352 may increase the efficiency of adding or removing the cover assembly 304 from the base 302. Furthermore, in implementation where the base 302 is constructed of a metal, a metal alloy, or other similarly ridged material, the base 304 having the single opening 320 can provide for a more efficient manufacturing process of the base 302. Additional benefits or advantages may be realized and/or achieved.

The device disclosed herein is further summarized in the following paragraphs and is further characterized by combinations of any and all of the various aspects described herein. According to an aspect of the present disclosure, an appliance includes an appliance cabinet defining a compartment, and an appliance door operably coupled to the appliance cabinet for selective access to the compartment. The appliance door includes a trim breaker, a door wrapper, and a door liner including studs coupled thereto. The door wrapper and the door liner are coupled to the trim breaker and define an insulation cavity therebetween. An at least partial vacuum is defined in the insulation cavity. A sensor assembly is coupled to the door liner and configured to sense a pressure in the insulation cavity. A vacuum port assembly is coupled to the door liner and in fluid communication with the insulation cavity. A port cover coupled to the appliance door. The port cover includes a base defining openings, and the vacuum port assembly and the sensor assembly are positioned in the openings, respectively. The base includes locking features on opposing sides of the base and stud connectors, where the locking features are configured to couple to opposing sides of the trim breaker, respectively. The stud connectors are configured to couple to the studs. A cover assembly is coupled to the base.

According to another aspect, a cover assembly includes a frame and a cover plate coupled to the frame. The cover plate is configured to extend over openings defined by a base.

According to yet another aspect, a cover plate is coupled to a frame via an adhesive.

According to another aspect, a cover assembly is a continuous cover configured to extend around a perimeter of a base and over openings defined by the base.

According to yet another aspect, openings of a base include a sensor assembly opening and a vacuum port assembly opening. The base includes a cross-member partially defining the sensor assembly opening and the vacuum port assembly opening.

According to another aspect of the present disclosure, a vacuum insulated door for an appliance includes a liner with studs extending therefrom, a wrapper, and a trim breaker coupled to the wrapper and the liner defining an insulation cavity therebetween. An at least partial vacuum is defined in the insulation cavity. A sensor assembly is coupled to a sensor port defined by the liner, the sensor port in fluid communication with the insulation cavity. A vacuum port assembly is coupled to the liner and in fluid communication with the insulation cavity. A port cover includes a base defining at least one opening in which the vacuum port assembly and the sensor assembly are positioned. The base includes stud connectors configured to engage the studs to couple the base to the vacuum insulated door. A cover assembly is coupled to the base.

According to another aspect, a trim breaker defines engagement features. A base includes locking features configured to couple to the trim breaker by engaging the engagement features.

According to another aspect, locking features include a resilient member having an engagement knob configured to engage a detent of engagement features defined on a trim breaker.

According to yet another aspect, engagement features include guides defining detents configured to receive an engagement knob when a port cover is coupled to a trim breaker.

According to another aspect, a cover assembly includes a cover bracket and a cover plate coupled to an outside wall of the cover bracket. The cover bracket defines engagement features configured to selectively engage engagement apertures defined by a base. The outside wall of the cover bracket extends over at least one opening of the base.

According to yet another aspect, studs are threaded posts configured to engage a fastener to couple a base to a vacuum insulated door.

According to another aspect, an at least one opening includes a first opening and a second opening. A cover assembly forms a continuous surface configured to extend around a perimeter of a base and over the first and second openings defined by the base.

According to yet another aspect, a fitment portion of each stud defines a frustoconical shape to engage a respective one of stud connectors and bias a port cover toward a liner.

According to yet another aspect of the present disclosure, a port cover for a vacuum insulated door includes a base including a base plate defining an opening configured to receive a vacuum port assembly and a sensor assembly of the vacuum insulated door. The base defines stud apertures configured to receive studs extending from the vacuum insulated door to couple the base to the vacuum insulated door. The base further includes walls extending from the base plate, wherein the walls define engagement apertures. A cover assembly includes a cover bracket including engagement features configured to selectively engage the engagement apertures to selectively couple the cover assembly to the base. An outside wall of the cover bracket extends over the opening when coupled to the base. The cover assembly further includes a cover plate coupled to the cover bracket.

According to another aspect, a cover plate is coupled to an outside wall of a cover bracket via an adhesive.

According to yet another aspect, engagement features each include a snap extension and a fastener coupled to the snap extension. The fasteners are configured to engage the engagement apertures of a base.

According to another aspect, an outside wall of a cover assembly defines access apertures that are aligned with engagement features.

According to yet another aspect, studs are threaded posts configured to engage a fastener to couple a base to a vacuum insulated door.

According to another aspect, a cover plate is coextensive with an outside wall of a cover assembly.

According to yet another aspect, a base is constructed of at least one of a metal and a metal alloy material. A cover bracket is constructed of a plastic material.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vacuum insulated door for an appliance, comprising:

a liner with studs extending therefrom;

a wrapper;

a trim breaker coupled the wrapper and the liner and defining an insulation cavity therebetween, wherein an at least partial vacuum is defined in the insulation cavity;

a sensor assembly coupled to a sensor port defined by the liner, the sensor port in fluid communication with the insulation cavity;

a vacuum port assembly coupled to the liner and in fluid communication with the insulation cavity; and a port cover including:

a base defining at least one opening in which the vacuum port assembly and the sensor assembly are positioned, the base includes stud connectors configured to engage the studs to couple the base to said vacuum insulated door; and a cover assembly coupled to the base.

2. The vacuum insulated door of claim 1, wherein the trim breaker defines engagement features, and wherein the base includes locking features configured to couple to the trim breaker by engaging the engagement features.

3. The vacuum insulated door of claim 2, wherein the locking features each include a resilient member having an engagement knob configured to engage detents of the engagement features defined by the trim breaker.

4. The vacuum insulated door of claim 3, wherein the engagement features include guides defining the detents configured to receive the engagement knobs when the port cover is coupled to the trim breaker.

5. The vacuum insulated door of claim 1, wherein the cover assembly includes a cover bracket and a cover plate coupled to an outside wall of the cover bracket, and wherein the cover bracket defines engagement features configured to selectively engage engagement apertures defined by the base, and further wherein the outside wall of the cover bracket extends over the at least one opening of the base.

6. The vacuum insulated door of claim 1, wherein the studs are threaded posts configured to engage a fastener to couple the base to said vacuum insulated door.

7. The vacuum insulated door of claim 1, wherein the at least one opening includes a first opening and a second opening, and wherein the cover assembly forms a continuous surface configured to extend around a perimeter of the base and over the first and second openings defined by the base.

8. The vacuum insulated door of claim 1, wherein a fitment portion of each of the studs defines a frustoconical shape to engage a respective one of the stud connectors and bias the port cover toward the liner.

9. A port cover for a vacuum insulated door, comprising:

a base including:

a base plate defining an opening configured to receive a vacuum port assembly and a sensor assembly of said vacuum insulated door, wherein the base defines stud apertures configured to receive studs extending from said vacuum insulated door to couple the base to said vacuum insulated door; and walls extending from the base plate, wherein the walls define engagement apertures; and a cover assembly including:

a cover bracket including engagement features configured to selectively engage the engagement apertures to selectively couple the cover assembly to the base, and wherein an outside wall of the cover bracket extends over the opening when coupled to the base; and a cover plate coupled to the cover bracket.

10. The port cover of claim 9, wherein the cover plate is coupled to the outside wall of the cover bracket via an adhesive.

11. The port cover of claim 9, wherein the engagement features each include a snap extension and a fastener coupled to the snap extension, wherein the fasteners are configured to snap engage the engagement apertures of the base.

12. The port cover of claim 9, wherein the outside wall of the cover assembly defines access apertures that are aligned with the engagement features.

13. The port cover of claim 9, wherein the studs are threaded posts configured to engage a fastener to couple the base to said vacuum insulated door.

14. The port cover of claim 9, wherein the cover plate is coextensive with the outside wall of the cover assembly.

15. The port cover of claim 9, wherein the base is constructed of at least one of a metal material and a metal alloy material, and wherein the cover bracket is constructed of a plastic material.

* * * * *